(12) United States Patent
Li et al.

(10) Patent No.: US 10,009,918 B2
(45) Date of Patent: Jun. 26, 2018

(54) METHOD FOR TRANSMITTING UPLINK DATA, USER EQUIPMENT, AND BASE STATION

(71) Applicant: Huawei Technologies Co., Ltd., Shenzhen, Guangdong (CN)

(72) Inventors: Zhongfeng Li, Shanghai (CN); Zhenfei Tang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 106 days.

(21) Appl. No.: 15/081,583

(22) Filed: Mar. 25, 2016

(65) Prior Publication Data
US 2016/0212761 A1    Jul. 21, 2016

Related U.S. Application Data

(63) Continuation of application No. PCT/CN2013/084543, filed on Sep. 27, 2013.

(51) Int. Cl.
*H04L 1/00*         (2006.01)
*H04W 72/12*     (2009.01)
(Continued)

(52) U.S. Cl.
CPC ....... *H04W 72/1273* (2013.01); *H04L 1/1812* (2013.01); *H04L 5/0055* (2013.01);
(Continued)

(58) Field of Classification Search
CPC . H04L 5/0053; H04L 27/2602; H04L 5/0055; H04L 5/14; H04L 5/001; H04L 1/18; H04W 72/04; H04W 72/0426
See application file for complete search history.

(56) References Cited

U.S. PATENT DOCUMENTS 8,553,591 B2    10/2013  Jiang et al.
9,363,804 B2 *  6/2016  Kim ...................... H04L 5/0053
(Continued)

FOREIGN PATENT DOCUMENTS

CN    101615951 A    12/2009
CN    101754268 A    6/2010
(Continued)

OTHER PUBLICATIONS

"Discussion on extended TTI bundling for UL VoIP with semi-persistent scheduling", 3GPP TSG RAN WG1 Meeting #69, May 21-25, 2012, 4 pages, R1-122316.
(Continued)

*Primary Examiner* — Raj Jain

(57) ABSTRACT

Embodiments of the present invention provide a method for transmitting uplink data, user equipment, and a base station. The method includes: when user equipment UE correctly receives, in a subframe n, downlink control signaling used for instructing the UE to transmit a physical uplink shared channel PUSCH, determining, by the UE according to the downlink control signaling and a subframe bundling configuration, a bundled subframe for transmitting the PUSCH, where the subframe bundling configuration includes a quantity of bundled subframes; and transmitting the PUSCH in the bundled subframe. In the embodiments of the present invention, a bundled subframe is introduced, which increases scheduling resources for a PUSCH, and enhances coverage performance of a signal.

21 Claims, 3 Drawing Sheets

(51) Int. Cl.
*H04L 5/14* (2006.01)
*H04L 5/00* (2006.01)
*H04L 1/18* (2006.01)

(52) U.S. Cl.
CPC ........... *H04L 5/14* (2013.01); *H04W 72/1268* (2013.01); *H04L 5/001* (2013.01)

(56) References Cited

U.S. PATENT DOCUMENTS

| | | | |
|---|---|---|---|
| 2011/0310777 | A1 | 12/2011 | Jiang et al. |
| 2011/0310856 | A1* | 12/2011 | Hariharan ............. H04L 1/1607 370/336 |
| 2012/0020315 | A1* | 1/2012 | Astely .................. H04L 1/1635 370/329 |
| 2013/0242889 | A1* | 9/2013 | Khoryaev ......... H04W 28/0268 370/329 |
| 2013/0258977 | A1 | 10/2013 | Kim |
| 2013/0258978 | A1* | 10/2013 | Aiba .................. H03M 13/136 370/329 |
| 2014/0153450 | A1 | 6/2014 | Jang et al. |
| 2016/0212761 | A1* | 7/2016 | Li ..................... H04W 72/1268 |

FOREIGN PATENT DOCUMENTS

| | | |
|---|---|---|
| CN | 101801094 A | 8/2010 |
| CN | 101854639 A | 10/2010 |
| CN | 102143596 A | 8/2011 |
| CN | 102761395 A | 10/2012 |
| KR | 20130018035 A | 2/2013 |
| WO | WO 2010/063166 A1 | 6/2010 |
| WO | WO 2010/111858 A1 | 10/2010 |
| WO | WO 2012/053861 A2 | 4/2012 |

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213 V10.8.0, Dec. 2012, 126 pages.

"Support of dynamic scheduling of TTI bundle transmissions", Panasonic, 3GPP TSG RAN WG2 Meeting #83, Aug. 19-23, 2013, 3 pages, R2-132431.

"3rd Generation Partnership Project; Technical Specification Group Radio Access Network; Evolved Universal Terrestrial Radio Access (E-UTRA); Physical layer procedures (Release 11)", 3GPP TS 36.213 V11.1.0, Dec. 2012, 160 pages.

Haiming Wang et al., "Performance of TTI Bundling for VoIP in EUTRAN TDD Mode", IEEE, 2009, 5 pages.

"On TTI bundling enhancements", Ericsson, ST-Ericsson, 3GPP TSG-RAN WG1 #69, May 21-25, 2012, 5 pages, R1-122013.

\* cited by examiner

METHOD FOR TRANSMITTING UPLINK DATA, USER EQUIPMENT, AND BASE STATION

CROSS-REFERENCE TO RELATED APPLICATIONS

This application is a continuation of International Application No. PCT/CN2013/084543, filed on Sep. 27, 2013, which is hereby incorporated by reference in its entirety.

TECHNICAL FIELD

Embodiments of the present invention relate to the wireless communications field, and more specifically, to a method for transmitting uplink data, user equipment, and a base station.

BACKGROUND

An LTE (Long Term Evolution) technology provides various IP (Internet protocol) based services, such as a voice over IP (VoIP, Voice over IP) service and a best effort data service. As an IP based transmission mechanism provides various services, the LTE optimizes transmission of the IP based services. For example, for the VoIP service, a transmission latency, a transmission period, signaling scheduling overheads, a user capacity, and the like of the service need to be considered. The VoIP service generally has a constant packet arrival period, for example, a typical value is 20 ms. The LTE defines various physical channels at a physical layer to transmit various messages, for example, a PUSCH (Physical Uplink Shared Channel), a PDSCH (Physical Downlink Shared Channel), a PUCCH (Physical Uplink Control Channel), and a PDCCH (Physical Downlink Control Channel). For a data channel, a basic TTI (Transmission Time Interval) is one subframe. One subframe is 1 ms and includes two timeslots. In each TTI, different UEs (user equipment) can use different frequency resources to share the TTI.

For a TDD (Time Division Duplex) system, one frame is 10 ms and includes 10 subframes, and each subframe is 1 ms. The subframes include a normal subframe and a special subframe, and the special subframe includes three parts: a downlink pilot timeslot, a guard interval, and an uplink pilot timeslot. An existing TDD system has an uplink/downlink subframe configuration, and uplink/downlink subframe configurations corresponding to a configuration 0 to a configuration 6 are shown in the following table:

| Uplink/downlink subframe configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D represents a downlink subframe, S represents a special subframe, and U represents an uplink subframe.

In the TDD system, for a latency-sensitive service such as a VoIP service, as the service has a requirement of a transmission latency and the service needs a specific scheduling period, resources that can be used to schedule a same data packet are limited, leading to low coverage performance of a signal.

SUMMARY

Embodiments of the present invention provide a method for transmitting uplink data, user equipment, and a base station, so as to enhance coverage performance of a signal.

According to a first aspect, a method for transmitting uplink data is provided, including: when user equipment UE correctly receives, in a subframe n, downlink control signaling used for instructing the UE to transmit a physical uplink shared channel PUSCH, determining, by the UE according to the downlink control signaling and a subframe bundling configuration, a bundled subframe for transmitting the PUSCH, where the subframe bundling configuration includes a quantity of bundled subframes; and transmitting the PUSCH in the bundled subframe.

With reference to the first aspect, in an implementation manner of the first aspect, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

With reference to the first aspect or any implementation manner described above of the first aspect, in another implementation manner of the first aspect, the quantity of bundled subframes is 12, and a quantity of hybrid automatic repeat request HARQ processes or a quantity of subframe bundling configurations of the UE is 1.

With reference to the first aspect or any implementation manner described above of the first aspect, in another implementation manner of the first aspect, the quantity of bundled subframes is less than 12, and a quantity of HARQ processes or a quantity of subframe bundling configurations of the UE is greater than 1, and the method further includes: when the UE does not correctly receive the downlink control signaling, determining, by the UE, the bundled subframe according to a physical hybrid automatic repeat request indicator channel PHICH used for instructing the UE to transmit the PUSCH and the subframe bundling configuration, where a receiving subframe of the PHICH is the $1^{th}$ subframe before the subframe n; and transmitting the PUSCH in the bundled subframe.

With reference to the first aspect or any implementation manner described above of the first aspect, in another implementation manner of the first aspect, the quantity of bundled subframes is 4, the quantity of HARQ processes or the quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

With reference to the first aspect or any implementation manner described above of the first aspect, in another implementation manner of the first aspect, the method further includes: receiving indication information sent by a base station, where the indication information is used for instructing the UE to transmit the PUSCH according to the subframe bundling configuration.

With reference to the first aspect or any implementation manner described above of the first aspect, in another implementation manner of the first aspect, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

With reference to the first aspect or any implementation manner described above of the first aspect, in another implementation manner of the first aspect, the quantity of bundled subframes is 6, and a quantity of HARQ processes or a quantity of subframe bundling configurations of the UE is 1.

With reference to the first aspect or any implementation manner described above of the first aspect, in another implementation manner of the first aspect, the quantity of bundled subframes is less than 6, and a quantity of HARQ processes or a quantity of subframe bundling configurations of the UE is greater than 1, and the method further includes: when the UE does not correctly receive the downlink control signaling, determining, by the UE, the bundled subframe according to a PHICH used for instructing the UE to transmit the PUSCH and the subframe bundling configuration, where a receiving subframe of the PHICH is the $l^{th}$ subframe before the subframe n; and transmitting the PUSCH in the bundled subframe.

With reference to the first aspect or any implementation manner described above of the first aspect, in another implementation manner of the first aspect, the quantity of bundled subframes is 3, the quantity of HARQ processes or the quantity of subframe bundling configurations of the UE is 2, and n and l meet: when n=0, l=1; when n=9, l=1; or when n=8, l=8.

With reference to the first aspect or any implementation manner described above of the first aspect, in another implementation manner of the first aspect, the quantity of bundled subframes is 2, the quantity of HARQ processes or the quantity of subframe bundling configurations of the UE is 3, and n and l meet: when n=0, l=2; when n=8, l=9; or when n=9, l=9.

With reference to the first aspect or any implementation manner described above of the first aspect, in another implementation manner of the first aspect, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

With reference to the first aspect or any implementation manner described above of the first aspect, in another implementation manner of the first aspect, the quantity of bundled subframes is 10.

With reference to the first aspect or any implementation manner described above of the first aspect, in another implementation manner of the first aspect, a quantity of HARQ processes or a quantity of subframe bundling configurations of the UE is 1, and the bundled subframe is 10 consecutive uplink subframes in the configuration 6.

With reference to the first aspect or any implementation manner described above of the first aspect, in another implementation manner of the first aspect, a quantity of HARQ processes or a quantity of subframe bundling configurations of the UE is 2, and an interval of one uplink subframe exists between adjacent subframes in the bundled subframe.

With reference to the first aspect or any implementation manner described above of the first aspect, in another implementation manner of the first aspect, a quantity of HARQ processes or a quantity of subframe bundling con-figurations of the UE is 3, and an interval of four uplink subframes exists between adjacent subframes in the bundled subframe.

With reference to the first aspect or any implementation manner described above of the first aspect, in another implementation manner of the first aspect, the quantity of bundled subframes is less than 10, and a quantity of HARQ processes or a quantity of subframe bundling configurations of the UE is greater than 1, and the method further includes: when the UE does not correctly receive the downlink control signaling, determining, by the UE, the bundled subframe according to a PHICH used for instructing the UE to transmit the PUSCH and the subframe bundling configuration, where a receiving subframe of the PHICH is the $l^{th}$ subframe before the subframe n; and transmitting the PUSCH in the bundled subframe.

With reference to the first aspect or any implementation manner described above of the first aspect, in another implementation manner of the first aspect, the quantity of bundled subframes is 5, the quantity of HARQ processes or the quantity of subframe bundling configurations of the UE is 2, and n and l meet: when n=0, l=0; when n=1, l=0; when n=5, l=0; when n=6, l=0; or when n=9, l=0.

With reference to the first aspect or any implementation manner described above of the first aspect, in another implementation manner of the first aspect, the quantity of bundled subframes is 2, the quantity of HARQ processes or the quantity of subframe bundling configurations of the UE is 3, and n and l meet: when n=0, l=−1; when n=5, when n=9, l=−1; when n=1, or when n=6, l=−3.

With reference to the first aspect or any implementation manner described above of the first aspect, in another implementation manner of the first aspect, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the method further includes: when the UE does not correctly receive the downlink control signaling, determining, by the UE, the bundled subframe according to a PHICH used for instructing the UE to transmit the PUSCH and the subframe bundling configuration, where a receiving subframe of the PHICH is the $l^{th}$ subframe before the subframe n; and transmitting the PUSCH in the bundled subframe.

With reference to the first aspect or any implementation manner described above of the first aspect, in another implementation manner of the first aspect, n, l, and k meet: when n=6, k=6 and l=2; or when n=1, k=6 and l=2.

With reference to the first aspect or any implementation manner described above of the first aspect, in another implementation manner of the first aspect, n, k, and l meet: when n=4, k=4 and l=3; or when n=9, k=4 and l=3.

With reference to the first aspect or any implementation manner described above of the first aspect, in another implementation manner of the first aspect, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the first aspect or any implementation manner described above of the first aspect, in another implementation manner of the first aspect, the quantity of bundled subframes is 1, and the method further includes: receiving, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

With reference to the first aspect or any implementation manner described above of the first aspect, in another implementation manner of the first aspect, the quantity of bundled subframes is 4, and an interval of two uplink subframes exists between adjacent subframes in the bundled subframe.

With reference to the first aspect or any implementation manner described above of the first aspect, in another implementation manner of the first aspect, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the first aspect or any implementation manner described above of the first aspect, in another implementation manner of the first aspect, the quantity of bundled subframes is 1, and the method further includes: when the UE does not correctly receive the downlink control signaling, determining, by the UE, the bundled subframe according to a PHICH used for instructing the UE to transmit the PUSCH and the subframe bundling configuration, where a receiving subframe of the PHICH is the $l^{th}$ subframe before the subframe n; and transmitting the PUSCH in the bundled subframe, where n, l, and k meet: when n=8, k=4 and l=0; or when n=9, k=4 and l=0.

With reference to the first aspect or any implementation manner described above of the first aspect, in another implementation manner of the first aspect, the quantity of bundled subframes is 4, and an interval of two uplink subframes exists between adjacent subframes in the bundled subframe.

With reference to the first aspect or any implementation manner described above of the first aspect, in another implementation manner of the first aspect, a current uplink/downlink subframe configuration is a configuration 5, and the quantity of bundled subframes is 2.

With reference to the first aspect or any implementation manner described above of the first aspect, in another implementation manner of the first aspect, a quantity of HARQ processes or a quantity of subframe bundling configurations of the UE is 4, and an interval of three uplink subframes exists between a previous subframe and a next subframe in the bundled subframe.

With reference to the first aspect or any implementation manner described above of the first aspect, in another implementation manner of the first aspect, a quantity of HARQ processes or a quantity of subframe bundling configurations of the UE is 5, and an interval of four uplink subframes exists between a previous subframe and a next subframe in the bundled subframe.

With reference to the first aspect or any implementation manner described above of the first aspect, in another implementation manner of the first aspect, the subframe bundling configuration is set to allow a quantity of subframes available for transmitting the PUSCH under a condition of meeting a requirement of a transmission latency to be equal to a quantity of uplink subframes in a semi-persistent scheduling period.

According to a second aspect, a method for transmitting uplink data is provided, including: when a base station sends, in a subframe n, downlink control signaling used for instructing the user equipment UE to transmit a physical uplink shared channel PUSCH, determining, by the base station according to the downlink control signaling and a subframe bundling configuration, a bundled subframe for transmitting the PUSCH, where the subframe bundling configuration includes a quantity of bundled subframes; and receiving the PUSCH in the bundled subframe.

With reference to the second aspect, in an implementation manner of the second aspect, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

With reference to the second aspect or any implementation manner described above of the second aspect, in another implementation manner of the second aspect, the quantity of bundled subframes is 12, and a quantity of hybrid automatic repeat request HARQ processes or a quantity of subframe bundling configurations of the UE is 1.

With reference to the second aspect or any implementation manner described above of the second aspect, in another implementation manner of the second aspect, the quantity of bundled subframes is less than 12, and a quantity of HARQ processes or a quantity of subframe bundling configurations of the UE is greater than 1, and the method further includes: when the base station sends, to the UE, a physical hybrid automatic repeat request indicator channel PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

With reference to the second aspect or any implementation manner described above of the second aspect, in another implementation manner of the second aspect, the quantity of bundled subframes is 4, the quantity of HARQ processes or the quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

With reference to the second aspect or any implementation manner described above of the second aspect, in another implementation manner of the second aspect, the method further includes: sending indication information to the UE, where the indication information is used for instructing the UE to transmit the PUSCH according to the subframe bundling configuration.

With reference to the second aspect or any implementation manner described above of the second aspect, in another implementation manner of the second aspect, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

With reference to the second aspect or any implementation manner described above of the second aspect, in another implementation manner of the second aspect, the quantity of bundled subframes is 6, and a quantity of HARQ processes or a quantity of subframe bundling configurations of the UE is 1.

With reference to the second aspect or any implementation manner described above of the second aspect, in another implementation manner of the second aspect, the quantity of bundled subframes is less than 6, and a quantity of HARQ processes or a quantity of subframe bundling configurations of the UE is greater than 1, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

With reference to the second aspect or any implementation manner described above of the second aspect, in another implementation manner of the second aspect, the quantity of bundled subframes is 3, the quantity of HARQ processes or the quantity of subframe bundling configurations of the UE is 2, and n and l meet: when n=0, l=1; when n=9, l=1; or when n=8, l=8.

With reference to the second aspect or any implementation manner described above of the second aspect, in another implementation manner of the second aspect, the quantity of bundled subframes is 2, the quantity of HARQ processes or the quantity of subframe bundling configurations of the UE is 3, and n and l meet: when n=0, l=2; when n=8, l=9; or when n=9, l=9.

With reference to the second aspect or any implementation manner described above of the second aspect, in another implementation manner of the second aspect, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

With reference to the second aspect or any implementation manner described above of the second aspect, in another implementation manner of the second aspect, the quantity of bundled subframes is 10.

With reference to the second aspect or any implementation manner described above of the second aspect, in another implementation manner of the second aspect, a quantity of HARQ processes or a quantity of subframe bundling configurations of the UE is 1, and the bundled subframe is 10 consecutive uplink subframes in the configuration 6.

With reference to the second aspect or any implementation manner described above of the second aspect, in another implementation manner of the second aspect, a quantity of HARQ processes or a quantity of subframe bundling configurations of the UE is 2, and an interval of one uplink subframe exists between adjacent subframes in the bundled subframe.

With reference to the second aspect or any implementation manner described above of the second aspect, in another implementation manner of the second aspect, a quantity of HARQ processes or a quantity of subframe bundling configurations of the UE is 3, and an interval of four uplink subframes exists between adjacent subframes in the bundled subframe.

With reference to the second aspect or any implementation manner described above of the second aspect, in another implementation manner of the second aspect, the quantity of bundled subframes is less than 10, and a quantity of HARQ processes or a quantity of subframe bundling configurations of the UE is greater than 1, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

With reference to the second aspect or any implementation manner described above of the second aspect, in another implementation manner of the second aspect, the quantity of bundled subframes is 5, the quantity of HARQ processes or the quantity of subframe bundling configurations of the UE is 2, and n and l meet: when n=0, l=0; when n=1, l=0; when n=5, l=0; when n=6, l=0; or when n=9, l=0.

With reference to the second aspect or any implementation manner described above of the second aspect, in another implementation manner of the second aspect, the quantity of bundled subframes is 2, the quantity of HARQ processes or the quantity of subframe bundling configurations of the UE is 3, and n and l meet: when n=0, l=−1; when n=5, when n=9, l=−1; when n=1, or when n=6, l=−3.

With reference to the second aspect or any implementation manner described above of the second aspect, in another implementation manner of the second aspect, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

With reference to the second aspect or any implementation manner described above of the second aspect, in another implementation manner of the second aspect, n, l, and k meet: when n=6, k=6 and l=2; or when n=1, k=6 and l=2.

With reference to the second aspect or any implementation manner described above of the second aspect, in another implementation manner of the second aspect, n, k, and l meet: when n=4, k=4 and l=3; or when n=9, k=4 and l=3.

With reference to the second aspect or any implementation manner described above of the second aspect, in another implementation manner of the second aspect, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the second aspect or any implementation manner described above of the second aspect, in another implementation manner of the second aspect, the quantity of bundled subframes is 1, and the method further includes: receiving, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

With reference to the second aspect or any implementation manner described above of the second aspect, in another implementation manner of the second aspect, the quantity of bundled subframes is 4, and an interval of two uplink subframes exists between adjacent subframes in the bundled subframe.

With reference to the second aspect or any implementation manner described above of the second aspect, in another implementation manner of the second aspect, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the second aspect or any implementation manner described above of the second aspect, in another implementation manner of the second aspect, the quantity of bundled subframes is 1, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe, where n, l, and k meet: when n=8, k=4 and l=0; or when n=9, k=4 and l=0.

With reference to the second aspect or any implementation manner described above of the second aspect, in another implementation manner of the second aspect, the quantity of bundled subframes is 4, and an interval of two uplink subframes exists between adjacent subframes in the bundled subframe.

With reference to the second aspect or any implementation manner described above of the second aspect, in another implementation manner of the second aspect, a current uplink/downlink subframe configuration is a configuration 5, and the quantity of bundled subframes is 2.

With reference to the second aspect or any implementation manner described above of the second aspect, in another implementation manner of the second aspect, a quantity of HARQ processes or a quantity of subframe bundling configurations of the UE is 4, and an interval of three uplink subframes exists between a previous subframe and a next subframe in the bundled subframe.

With reference to the second aspect or any implementation manner described above of the second aspect, in another implementation manner of the second aspect, a quantity of HARQ processes or a quantity of subframe bundling configurations of the UE is 5, and an interval of four uplink subframes exists between a previous subframe and a next subframe in the bundled subframe.

With reference to the second aspect or any implementation manner described above of the second aspect, in another implementation manner of the second aspect, the subframe bundling configuration is set to allow a quantity of subframes available for transmitting the PUSCH under a condition of meeting a requirement of a transmission latency to be equal to a quantity of uplink subframes in a semi-persistent scheduling period.

According to a third aspect, user equipment UE is provided, including: a determining unit, configured to: when the UE correctly receives, in a subframe n, downlink control signaling used for instructing the UE to transmit a physical uplink shared channel PUSCH, determine, according to the downlink control signaling and a subframe bundling configuration, a bundled subframe for transmitting the PUSCH, where the subframe bundling configuration includes a quantity of bundled subframes; and a transmitting unit, configured to transmit the PUSCH in the bundled subframe determined by the determining unit.

With reference to the third aspect, in another implementation manner of the third aspect, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

With reference to the third aspect or any implementation manner described above of the third aspect, in another implementation manner of the third aspect, the quantity of bundled subframes is 12, and a quantity of hybrid automatic repeat request HARQ processes or a quantity of subframe bundling configurations of the UE is 1.

With reference to the third aspect or any implementation manner described above of the third aspect, in another implementation manner of the third aspect, the quantity of bundled subframes is less than 12, and a quantity of HARQ processes or a quantity of subframe bundling configurations of the UE is greater than 1, and the determining unit is further configured to: when the UE does not correctly receive the downlink control signaling, determine the bundled subframe according to a physical hybrid automatic repeat request indicator channel PHICH used for instructing the UE to transmit the PUSCH and the subframe bundling configuration, where a receiving subframe of the PHICH is the $l^{th}$ subframe before the subframe n; and the transmitting unit is further configured to transmit the PUSCH in the bundled subframe determined by the determining unit.

With reference to the third aspect or any implementation manner described above of the third aspect, in another implementation manner of the third aspect, the quantity of bundled subframes is 4, the quantity of HARQ processes or the quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

With reference to the third aspect or any implementation manner described above of the third aspect, in another implementation manner of the third aspect, the UE further includes: a receiving unit, configured to receive indication information sent by a base station, where the indication information is used for instructing the UE to transmit the PUSCH according to the subframe bundling configuration.

With reference to the third aspect or any implementation manner described above of the third aspect, in another implementation manner of the third aspect, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

With reference to the third aspect or any implementation manner described above of the third aspect, in another implementation manner of the third aspect, the quantity of bundled subframes is 6, and a quantity of HARQ processes or a quantity of subframe bundling configurations of the UE is 1.

With reference to the third aspect or any implementation manner described above of the third aspect, in another implementation manner of the third aspect, the quantity of bundled subframes is less than 6, and a quantity of HARQ processes or a quantity of subframe bundling configurations of the UE is greater than 1, and the determining unit is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit is configured to transmit the PUSCH in the bundled subframe determined by the determining unit.

With reference to the third aspect or any implementation manner described above of the third aspect, in another implementation manner of the third aspect, the quantity of bundled subframes is 3, the quantity of HARQ processes or the quantity of subframe bundling configurations of the UE is 2, and n and l meet: when n=0, l=1; when n=9, l=1; or when n=8, l=8.

With reference to the third aspect or any implementation manner described above of the third aspect, in another implementation manner of the third aspect, the quantity of bundled subframes is 2, the quantity of HARQ processes or the quantity of subframe bundling configurations of the UE is 3, and n and l meet: when n=0, l=2; when n=8, l=9; or when n=9, l=9.

With reference to the third aspect or any implementation manner described above of the third aspect, in another implementation manner of the third aspect, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

With reference to the third aspect or any implementation manner described above of the third aspect, in another implementation manner of the third aspect, the quantity of bundled subframes is 10.

With reference to the third aspect or any implementation manner described above of the third aspect, in another implementation manner of the third aspect, a quantity of HARQ processes or a quantity of subframe bundling configurations of the UE is 1, and the bundled subframe is 10 consecutive uplink subframes in the configuration 6.

With reference to the third aspect or any implementation manner described above of the third aspect, in another implementation manner of the third aspect, a quantity of HARQ processes or a quantity of subframe bundling configurations of the UE is 2, and an interval of one uplink subframe exists between adjacent subframes in the bundled subframe.

With reference to the third aspect or any implementation manner described above of the third aspect, in another implementation manner of the third aspect, a quantity of HARQ processes or a quantity of subframe bundling configurations of the UE is 3, and an interval of four uplink subframes exists between adjacent subframes in the bundled subframe.

With reference to the third aspect or any implementation manner described above of the third aspect, in another implementation manner of the third aspect, the quantity of bundled subframes is less than 10, and a quantity of HARQ processes or a quantity of subframe bundling configurations of the UE is greater than 1, and the determining unit is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit is further configured to transmit the PUSCH in the bundled subframe determined by the determining unit.

With reference to the third aspect or any implementation manner described above of the third aspect, in another implementation manner of the third aspect, the quantity of bundled subframes is 5, the quantity of HARQ processes or the quantity of subframe bundling configurations of the UE is 2, and n and l meet: when n=0, l=0; when n=1, l=0; when n=5, l=0; when n=6, l=0; or when n=9, l=0.

With reference to the third aspect or any implementation manner described above of the third aspect, in another implementation manner of the third aspect, the quantity of bundled subframes is 2, the quantity of HARQ processes or the quantity of subframe bundling configurations of the UE is 3, and n and l meet: when n=0, l=−1; when n=5, l=−1; when n=9, l=−1; when n=1, l=−4; or when n=6, l=−3.

With reference to the third aspect or any implementation manner described above of the third aspect, in another implementation manner of the third aspect, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the determining unit is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit is further configured to transmit the PUSCH in the bundled subframe determined by the determining unit.

With reference to the third aspect or any implementation manner described above of the third aspect, in another implementation manner of the third aspect, n, and k meet: when n=6, k=6 and l=2; or when n=1, k=6 and l=2.

With reference to the third aspect or any implementation manner described above of the third aspect, in another implementation manner of the third aspect, n, k, and l meet: when n=4, k=4 and l=3; or when n=9, k=4 and l=3.

With reference to the third aspect or any implementation manner described above of the third aspect, in another implementation manner of the third aspect, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the third aspect or any implementation manner described above of the third aspect, in another implementation manner of the third aspect, the quantity of bundled subframes is 1, and the UE further includes: a receiving unit, configured to receive, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

With reference to the third aspect or any implementation manner described above of the third aspect, in another implementation manner of the third aspect, the quantity of bundled subframes is 4, and an interval of two uplink subframes exists between adjacent subframes in the bundled subframe.

With reference to the third aspect or any implementation manner described above of the third aspect, in another implementation manner of the third aspect, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the third aspect or any implementation manner described above of the third aspect, in another implementation manner of the third aspect, the quantity of bundled subframes is 1, and the determining unit is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit is further configured to transmit the PUSCH in the bundled subframe determined by the determining unit, where n, l, and k meet: when n=8, k=4 and l=0; or when n=9, k=4 and l=0.

With reference to the third aspect or any implementation manner described above of the third aspect, in another implementation manner of the third aspect, the quantity of bundled subframes is 4, and an interval of two uplink subframes exists between adjacent subframes in the bundled subframe.

With reference to the third aspect or any implementation manner described above of the third aspect, in another implementation manner of the third aspect, a current uplink/downlink subframe configuration is a configuration 5, and the quantity of bundled subframes is 2.

With reference to the third aspect or any implementation manner described above of the third aspect, in another implementation manner of the third aspect, a quantity of HARQ processes or a quantity of subframe bundling configurations of the UE is 4, and an interval of three uplink subframes exists between a previous subframe and a next subframe in the bundled subframe.

With reference to the third aspect or any implementation manner described above of the third aspect, in another implementation manner of the third aspect, a quantity of HARQ processes or a quantity of subframe bundling configurations of the UE is 5, and an interval of four uplink subframes exists between a previous subframe and a next subframe in the bundled subframe.

With reference to the third aspect or any implementation manner described above of the third aspect, in another implementation manner of the third aspect, the subframe bundling configuration is set to allow a quantity of subframes available for transmitting the PUSCH under a condition of meeting a requirement of a transmission latency to be equal to a quantity of uplink subframes in a semi-persistent scheduling period.

According to a fourth aspect, a base station is provided, including: a determining unit, configured to: when the base station sends, in a subframe n, downlink control signaling used for instructing user equipment UE to transmit a physical uplink shared channel PUSCH, determine, according to the downlink control signaling and a subframe bundling configuration, a bundled subframe for transmitting the PUSCH, where the subframe bundling configuration includes a quantity of bundled subframes; and a receiving unit, configured to receive the PUSCH in the bundled subframe determined by the determining unit.

With reference to the fourth aspect, in another implementation manner of the fourth aspect, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

With reference to the fourth aspect or any implementation manner described above of the fourth aspect, in another implementation manner of the fourth aspect, the quantity of bundled subframes is 12, and a quantity of hybrid automatic repeat request HARQ processes or a quantity of subframe bundling configurations of the UE is 1.

With reference to the fourth aspect or any implementation manner described above of the fourth aspect, in another implementation manner of the fourth aspect, the quantity of bundled subframes is less than 12, and a quantity of HARQ processes or a quantity of subframe bundling configurations of the UE is greater than 1, and the determining unit is further configured to: when the base station sends, to the UE, a physical hybrid automatic repeat request indicator channel PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit is further configured to receive the PUSCH in the bundled subframe determined by the determining unit.

With reference to the fourth aspect or any implementation manner described above of the fourth aspect, in another implementation manner of the fourth aspect, the quantity of bundled subframes is 4, the quantity of HARQ processes or the quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

With reference to the fourth aspect or any implementation manner described above of the fourth aspect, in another implementation manner of the fourth aspect, the base station further includes: a sending unit, configured to send indication information to the UE, where the indication information is used for instructing the UE to transmit the PUSCH according to the subframe bundling configuration.

With reference to the fourth aspect or any implementation manner described above of the fourth aspect, in another implementation manner of the fourth aspect, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

With reference to the fourth aspect or any implementation manner described above of the fourth aspect, in another implementation manner of the fourth aspect, the quantity of bundled subframes is 6, and a quantity of HARQ processes or a quantity of subframe bundling configurations of the UE is 1.

With reference to the fourth aspect or any implementation manner described above of the fourth aspect, in another implementation manner of the fourth aspect, the quantity of bundled subframes is less than 6, and a quantity of HARQ processes or a quantity of subframe bundling configurations of the UE is greater than 1, and the determining unit is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit is further configured to receive the PUSCH in the bundled subframe determined by the determining unit.

With reference to the fourth aspect or any implementation manner described above of the fourth aspect, in another implementation manner of the fourth aspect, the quantity of bundled subframes is 3, the quantity of HARQ processes or the quantity of subframe bundling configurations of the UE is 2, and n and l meet: when n=0, l=1; when n=9, l=1; or when n=8, l=8.

With reference to the fourth aspect or any implementation manner described above of the fourth aspect, in another implementation manner of the fourth aspect, the quantity of bundled subframes is 2, the quantity of HARQ processes or the quantity of subframe bundling configurations of the UE is 3, and n and l meet: when n=0, l=2; when n=8, l=9; or when n=9, l=9.

With reference to the fourth aspect or any implementation manner described above of the fourth aspect, in another implementation manner of the fourth aspect, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

With reference to the fourth aspect or any implementation manner described above of the fourth aspect, in another implementation manner of the fourth aspect, the quantity of bundled subframes is 10.

With reference to the fourth aspect or any implementation manner described above of the fourth aspect, in another implementation manner of the fourth aspect, a quantity of HARQ processes or a quantity of subframe bundling configurations of the UE is 1, and the bundled subframe is 10 consecutive uplink subframes in the configuration 6.

With reference to the fourth aspect or any implementation manner described above of the fourth aspect, in another implementation manner of the fourth aspect, a quantity of HARQ processes or a quantity of subframe bundling configurations of the UE is 2, and an interval of one uplink subframe exists between adjacent subframes in the bundled subframe.

With reference to the fourth aspect or any implementation manner described above of the fourth aspect, in another implementation manner of the fourth aspect, a quantity of HARQ processes or a quantity of subframe bundling configurations of the UE is 3, and an interval of four uplink subframes exists between adjacent subframes in the bundled subframe.

With reference to the fourth aspect or any implementation manner described above of the fourth aspect, in another implementation manner of the fourth aspect, the quantity of bundled subframes is less than 10, and a quantity of HARQ processes or a quantity of subframe bundling configurations of the UE is greater than 1, and the determining unit is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit is further configured to receive the PUSCH in the bundled subframe determined by the determining unit.

With reference to the fourth aspect or any implementation manner described above of the fourth aspect, in another implementation manner of the fourth aspect, the quantity of bundled subframes is 5, the quantity of HARQ processes or the quantity of subframe bundling configurations of the UE is 2, and n and l meet: when n=0, l=0; when n=1, l=0; when n=5, l=0; when n=6, l=0; or when n=9, l=0.

With reference to the fourth aspect or any implementation manner described above of the fourth aspect, in another implementation manner of the fourth aspect, the quantity of bundled subframes is 2, the quantity of HARQ processes or the quantity of subframe bundling configurations of the UE is 3, and n and l meet: when n=0, l=−1; when n=5, l=−1; when n=9, l=−1; when n=1, or when n=6, l=−3.

With reference to the fourth aspect or any implementation manner described above of the fourth aspect, in another implementation manner of the fourth aspect, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the determining unit is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit is further configured to receive the PUSCH in the bundled subframe determined by the determining unit.

With reference to the fourth aspect or any implementation manner described above of the fourth aspect, in another implementation manner of the fourth aspect, n, l, and k meet: when n=6, k=6 and l=2; or when n=1, k=6 and l=2.

With reference to the fourth aspect or any implementation manner described above of the fourth aspect, in another implementation manner of the fourth aspect, n, k, and l meet: when n=4, k=4 and l=3; or when n=9, k=4 and l=3.

With reference to the fourth aspect or any implementation manner described above of the fourth aspect, in another implementation manner of the fourth aspect, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the fourth aspect or any implementation manner described above of the fourth aspect, in another implementation manner of the fourth aspect, the quantity of bundled subframes is 1, and the receiving unit is further configured to receive, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

With reference to the fourth aspect or any implementation manner described above of the fourth aspect, in another implementation manner of the fourth aspect, the quantity of bundled subframes is 4, and an interval of two uplink subframes exists between adjacent subframes in the bundled subframe.

With reference to the fourth aspect or any implementation manner described above of the fourth aspect, in another implementation manner of the fourth aspect, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

With reference to the fourth aspect or any implementation manner described above of the fourth aspect, in another implementation manner of the fourth aspect, the quantity of bundled subframes is 1, and the determining unit is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit is further configured to receive the PUSCH in the bundled subframe determined by the determining unit, where n, l, and k meet: when n=8, k=4 and l=0; or when n=9, k=4 and l=0.

With reference to the fourth aspect or any implementation manner described above of the fourth aspect, in another implementation manner of the fourth aspect, the quantity of bundled subframes is 4, and an interval of two uplink subframes exists between adjacent subframes in the bundled subframe.

With reference to the fourth aspect or any implementation manner described above of the fourth aspect, in another implementation manner of the fourth aspect, a current uplink/downlink subframe configuration is a configuration 5, and the quantity of bundled subframes is 2.

With reference to the fourth aspect or any implementation manner described above of the fourth aspect, in another implementation manner of the fourth aspect, a quantity of HARQ processes or a quantity of subframe bundling configurations of the UE is 4, and an interval of three uplink subframes exists between a previous subframe and a next subframe in the bundled subframe.

With reference to the fourth aspect or any implementation manner described above of the fourth aspect, in another implementation manner of the fourth aspect, a quantity of HARQ processes or a quantity of subframe bundling configurations of the UE is 5, and an interval of four uplink subframes exists between a previous subframe and a next subframe in the bundled subframe.

With reference to the fourth aspect or any implementation manner described above of the fourth aspect, in another implementation manner of the fourth aspect, the subframe bundling configuration is set to allow a quantity of subframes available for transmitting the PUSCH under a condition of meeting a requirement of a transmission latency to be equal to a quantity of uplink subframes in a semi-persistent scheduling period.

In the embodiments of the present invention, a bundled subframe is introduced, which increases scheduling resources for a PUSCH, and enhances coverage performance of a signal.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should further be understood that in the embodiments of the present invention, UE includes but is not limited to a MS (mobile station), a mobile terminal, a mobile telephone, a portable device, and the like. The user equipment may communicate with one or more core networks by using an RAN (Radio Access Network). For example, the user equipment may be a mobile telephone (or referred to as a "cellular" telephone), or a computer having a wireless communication function; or the user equipment may be a portable, pocket-sized, handheld, computer built-in, or in-vehicle mobile apparatus.

Figure 1:
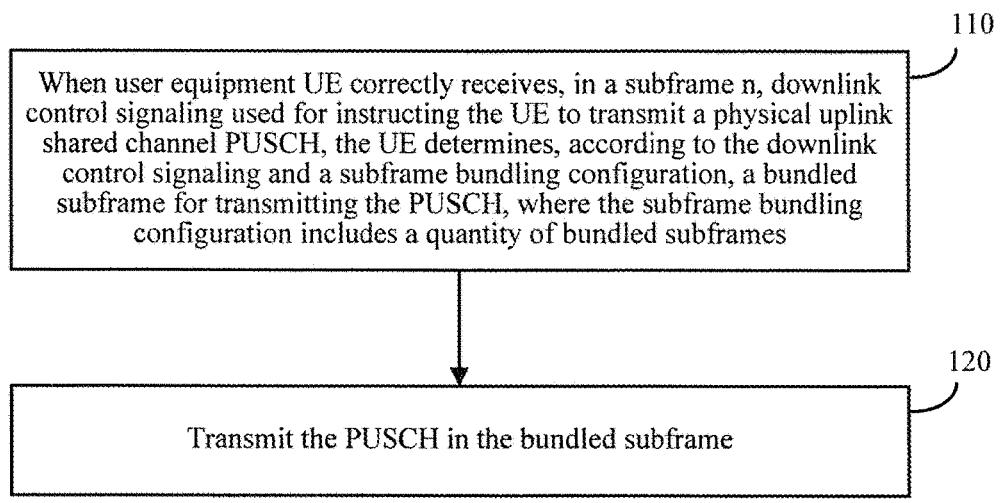
FIG. 1 is a schematic flowchart of a method for transmitting uplink data according to an embodiment of the present invention.

FIG. 1 is a schematic flowchart of a method for transmitting uplink data according to an embodiment of the present invention. The method in FIG. 1 is executed by UE, which may be, for example, a mobile phone. The method in FIG. 1 may be applied in a TDD system, and the method includes:

110: When the user equipment UE correctly receives, in a subframe n, downlink control signaling used for instructing the UE to transmit a physical uplink shared channel PUSCH, the UE determines, according to the downlink control signaling and a subframe bundling configuration, a bundled subframe for transmitting the PUSCH, where the subframe bundling configuration includes a quantity of bundled subframes.

The downlink control signaling may be a PDCCH, or may be an EPDCCH (enhanced physical downlink control channel, Enhanced PDCCH). The subframe n may specifically refer to the $n^{th}$ subframe in any radio frame, a value of n ranges from 0 to 9, and the subframe n herein is a downlink subframe.

It should be understood that, the subframe bundling configuration may be pre-configured between the UE and a base station, or may be notified by a base station to the UE by using signaling, for example, notified by using signaling, such as RRC (Radio resource control), RAR (random access response), MAC (Media Access Control, Medium access control), or DCI (downlink control information) signaling. The subframe bundling configuration includes but is not limited to the quantity of bundled subframes, for example, the subframe bundling configuration may further include a timing relationship between a PDCCH and the PUSCH (referred to as a first timing relationship below), may further include a timing relationship between a PHICH used for triggering the PUSCH and the PUSCH (referred to as a second timing relationship below), and may further include a distribution manner of the bundled subframe, for example, whether the bundled subframe is distributed in consecutive uplink subframes, or distributed in consecutive uplink subframes at an interval. Certainly, the timing relationships may also be not included in the subframe bundling configuration, but pre-defined by the base station and the UE or notified by the base station to the UE by using signaling.

120: Transmit the PUSCH in the bundled subframe.

In this embodiment of the present invention, a bundled subframe is introduced, which increases scheduling resources for a PUSCH, and enhances coverage performance of a signal.

Optionally, the subframe bundling configuration is set to allow a quantity of subframes available for transmitting the PUSCH under a condition of meeting a requirement of a transmission latency to be equal to a quantity of uplink subframes in a semi-persistent scheduling period. The subframe bundling configuration may be used for indicating a location of the bundled subframe, for example, the subframe bundling configuration not only includes the quantity of bundled subframes, but also includes a timing relationship between subframes in a current subframe configuration. The meeting a requirement of a transmission latency may specifically refer to being within a time required for the transmission latency.

The timing relationship between subframes includes the first timing relationship, and when retransmission occurs in a current process, the timing relationship between subframes may further include the second timing relationship, where the second timing relationship is used for indicating a timing relationship between a receiving subframe of the PHICH and the start subframe, and the PHICH is used for triggering the PUSCH. Certainly, the timing relationship between subframes may further include a timing relationship from the PUSCH to the PHICH.

The requirement of the transmission latency may be a requirement of a latency of a data service carried on the PUSCH, for example, a transmission latency of a VoIP service is roughly 50 ms, and the semi-persistent scheduling period may be a packet arrival period of the VoIP service, which may be, for example, 10 ms or 20 ms.

It should be noted that, the quantity of subframes available for transmitting the PUSCH under the condition of meeting the requirement of the transmission latency merely indicates a possibility, and a quantity of actual subframes for transmitting the PUSCH is less than or equal to the quantity of available subframes. Actually, the quantity of available subframes may be a product of a quantity of times of initial transmission plus allowed retransmission and the quantity of bundled subframes under consideration of factors: the semi-persistent scheduling period and the transmission latency. An example is used for description. A packet arrival period (corresponding to the semi-persistent scheduling period) of a VoIP data packet is 20 ms, a VoIP transmission latency is 50 ms, the quantity of bundled subframes is 4, a current subframe configuration is 0, and a timing relationship between initial transmission and retransmission is adjusted, so that one time of initial transmission and three times of retransmission can be performed within 50 ms, each time of transmission is completed within 20 ms; and then the quantity of available subframes is equal to 4×3=12. However, actually, the initial transmission may succeed, no retransmission is required, and then the quantity of actual subframes for transmitting the PUSCH is 4; or the initial transmission fails, the first time of retransmission succeeds, and then the quantity of actual subframes for transmitting the PUSCH is 8. Only in a case in which the initial transmission and the first two times of retransmission all fail, 12 subframes are used.

It should be noted that, after the requirement of the transmission latency and the semi-persistent scheduling period are determined, the quantity of subframes available for transmitting the PUSCH is determined accordingly, for example, when a transmission latency of 50 ms is met and the semi-persistent scheduling period is 20 ms, a quantity of subframes in uplink/downlink subframe configurations 0 to 6 and available for transmitting the PUSCH are respectively 12, 8, 4, 6, 4, 2, and 10.

A specific manner of determining, according to the downlink control signaling and a subframe bundling configuration, a bundled subframe for transmitting the PUSCH in step 110 may be: First, the UE receives the downlink control signaling in the subframe n; then, the UE determines, according to the first timing relationship, a start subframe for transmitting the PUSCH; and next, the UE determines, from the start subframe according to the quantity of bundled subframes (m is used as an example) and a current uplink/downlink subframe configuration, m consecutive uplink subframes as the bundled subframe for transmitting the PUSCH.

It should be noted that, a distribution manner of the bundled subframe is not specifically limited in this embodiment of the present invention, where the bundled subframe may be consecutive uplink subframes in the current uplink/downlink subframe configuration, or may be non-consecutive uplink subframes in the current uplink/downlink subframe configuration. For example, the subframe bundling configuration may carry indication information indicating whether the bundled subframe is consecutively distributed or non-consecutively distributed. Certainly, when the subframe bundling configuration may also not carry the indication information, a manner of consecutive distribution or a manner of non-consecutive distribution is used by default.

Further, when the bundled subframe is non-consecutively distributed, the UE needs to transmit the PUSCH in the non-consecutive bundled subframe according to indication of the subframe bundling configuration. For example, the subframe bundling configuration may indicate a quantity of milliseconds between adjacent subframes in the bundled subframe, or a quantity of subframes between adjacent subframes in the bundled subframe, or a quantity of uplink subframes between two adjacent bundled subframes.

It should be noted that, the manner of non-consecutive distribution is not necessarily indicated in the information in the subframe bundling configuration, and may also be pre-defined or be indicated by the base station by using signaling.

It should be noted that, the quantity of bundled subframes is not specifically limited in this embodiment of the present invention, and needs to be comprehensively determined according to an actual situation, for example, factors such as a service type of a currently transmitted data packet and a packet arrival period (or a semi-persistent scheduling period). In addition, the quantity of bundled subframes in this embodiment of the present invention may be 1 (which may be understood as that no subframes are bundled) or may be greater than 1.

It should be further understood that, the subframe bundling configuration may indicate the quantity of bundled subframes and the first timing relationship, but this embodiment of the present invention is not limited thereto. For example, the subframe bundling configuration may further indicate a quantity of HARQ processes. When there are multiple HARQ processes, the subframe bundling configuration may further indicate the second timing relationship, where the second timing relationship is used for indicating a correspondence between the receiving subframe of the PHICH and the start subframe for transmitting the PUSCH, and the PHICH is used for triggering transmission of the PUSCH, or the second timing relationship is the timing relationship from the PUSCH to the PHICH.

Descriptions are respectively provided below for different subframe configurations in a TDD system.

Optionally, as an embodiment, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

Optionally, the quantity of bundled subframes may be 12, and a quantity of HARQ processes or a quantity of subframe bundling configurations of the UE may be 1. A specific solution is shown in the following table:

"1" under all of subframes 2, 3, and 4 of the frame n, which indicates that the UE can send the PUSCH to the base station in the subframes 2, 3, and 4 of the frame n. Similarly, when there is a number in a UL grant line, it indicates that downlink control signaling, such as a PDCCH or an EPDCCH, of a process corresponding to the number is scheduled in a subframe corresponding to the number, for example, there is a number "2" at a position of intersection of a subframe 6 of the frame n+1 and the UL grant line, which indicates that the base station sends downlink control signaling to the UE in the subframe. Similarly, a number in a PHICH line indicates that, in a subframe corresponding to the number in the PHICH, the base station indicates whether a process corresponding to the number requires retransmission or triggers PUSCH sending performed in a next bundled subframe of the process.

Specifically, in the solution shown in Table 1, the quantity of bundled subframes is configured according to a quantity of available UL (Uplink) subframes within 20 ms. In the configuration 0, the quantity of available UL subframes within 20 ms is 12 (each frame has six available UL subframes), and then the quantity of bundled subframes may be set to 12, the quantity of HARQ processes (which may also be referred to as a quantity of subframe bundling configurations) of the UE may be set to 1, and one VoIP packet is transmitted in 12 bundled TTIs/UL subframes within 50 ms. This solution can better support semi-persistent scheduling transmission with a period of 20 ms or a multiple of 20 ms.

TABLE 1

| Configuration being 0 and the quantity of bundled subframes being 12 | | | | | | | | | | | | | | | | | | | |
|---|---|---|---|---|---|---|---|---|---|---|---|---|---|---|---|---|---|---|---|
| Frame n | | | | | | | | | | Frame n + 1 | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | U | D | S | U | U | U | D | S | U | U | U | D | S | U | U | U |
| PHICH | | | | | | | | | | | | | | | | | | | |
| UL grant | | | | | | | | | | | | | | | | 2 | | | |
| PUSCH | | 1 | 1 | 1 | | | 1 | 1 | 1 | | | 1 | 1 | 1 | | | 1 | 1 | 1 |
| Frame n + 2 | | | | | | | | | | Frame n + 3 | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | U | D | S | U | U | U | D | S | U | U | U | D | S | U | U | U |
| PHICH | | | | | | | | | | | | | | | | | | | |
| UL grant | | | | | | | | | | | | | | | | 1 | | | |
| PUSCH | | 2 | 2 | 2 | | | 2 | 2 | 2 | | | 2 | 2 | 2 | | | 2 | 2 | 2 |
| Frame n + 4 | | | | | | | | | | Frame n + 5 | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | U | D | S | U | U | U | D | S | U | U | U | D | S | U | U | U |
| PHICH | | | | | | | | | | | | | | | | | | | |
| UL grant | | | | | | | | | | | | | | | | 2 | | | |
| PUSCH | | 1 | 1 | 1 | | | 1 | 1 | 1 | | | 1 | 1 | 1 | | | 2 | 2 | 2 |

It should be noted that, in Table 1, the frame n, the frame n+1, . . . , and the frame n+5 indicate a time sequence. Specifically, each frame corresponds to 10 subframes (that is, subframes 0 to 9), and the frame n, the frame n+1, . . . , and the frame n+5 are six consecutive radio frames in time. In the table, numbers "1" and "2" respectively represent different processes, and a same number represents a same process. When there is a number in a PUSCH line, it indicates that PUSCH scheduling occurs in a subframe corresponding to the number, for example, there is a number A value of a timing relationship between downlink scheduling signaling and the first uplink subframe of the bundled uplink subframes may be obtained according to a value in an existing system. The UE receives the PDCCH/EPDCCH in the subframe n, and transmits the PUSCH in the bundled subframe starting from the $k^{th}$ subframe after the subframe n (briefly referred to as a subframe n+k below). When n is 0 or 5, a value of k is 4; or when n is 1 or 6, a value of k is 6. Values of n and k are shown in Table 2:

TABLE 2

Correspondence between values of n and k

| | n | | | | | | | | | |
|---|---|---|---|---|---|---|---|---|---|---|
| | 0 | 1 | 2 | 3 | 4 | 5 | 6 | 7 | 8 | 9 |
| k | 4 | 6 | | | | 4 | 6 | | | |

In the solution in Table 1, because there is only one HARQ process and there is no HARQ retransmission, no PHICH needs to be sent or detected, and a physical layer may set a PHICH state or an HARQ feedback state of the PUSCH to ACK, where the PHICH state or the HARQ feedback state of the PUSCH is transferred to a higher layer.

Optionally, the quantity of bundled subframes is less than 12, and a quantity of HARQ processes or a quantity of subframe bundling configurations of the UE is greater than 1, and the method in FIG. 1 may further include: when the UE does not correctly receive the downlink control signaling, determining, by the UE, the bundled subframe according to a physical hybrid automatic repeat request indicator channel PHICH used for instructing the UE to transmit the PUSCH and the subframe bundling configuration, where a receiving subframe of the PHICH is the $l^{th}$ subframe before the subframe n (briefly referred to as a subframe n−l below); and transmitting the PUSCH in the bundled subframe.

It should be noted that, that when the UE does not correctly receive the downlink control signaling, the UE sends the PUSCH according to indication of the PHICH does not indicate that when the UE correctly receives the downlink control signaling, the UE does not need to receive a PHICH. Actually, as long as retransmission is required, the UE needs to receive a PHICH.

When the UE does not correctly receive the downlink control signaling, it indicates that in this case, the base station indicates or triggers retransmission by using a PHICH, and the UE needs to determine, according to a temporal relationship between the PHICH and the PUSCH and the subframe bundling configuration, the bundled subframe for sending the PUSCH.

It should be noted that, the PHICH may indicate whether a previous bundled subframe that is in a same process with the bundled subframe requires retransmission, and if the previous bundled subframe requires retransmission, the PHICH triggers retransmission of the PUSCH, or if the previous bundled subframe requires no retransmission, the PHICH and the downlink control signaling for the PUSCH jointly trigger initial transmission of the PUSCH.

Optionally, the quantity of bundled subframes is 4, a quantity of HARQ processes or a quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5. A specific solution is shown in Table 3:

TABLE 3

Configuration being 0 and the quantity of bundled subframes being 4

| | Frame n | | | | | | | | | | Frame n + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | S | U | U | D | S | U | U | D | S | U | U | D | S | U | U |
| PHICH | 1 | | | | 2 | | | | | | 1 | | | | 2 | | | | | |
| UL grant | | 2 | | | | | 1 | | | | | | 2 | | | | 1 | | | |
| PUSCH | | | 1 | 1 | 1 | | | | 2 | 2 | 2 | | | 1 | 1 | 1 | | | 2 | 2 | 2 |

| | Frame n + 2 | | | | | | | | | | Frame n + 3 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | S | U | U | D | S | U | U | D | S | U | U | D | S | U | U |
| PHICH | 1 | | | | 2 | | | | | | 1 | | | | 2 | | | | | |
| UL grant | | 2 | | | | | 1 | | | | | | 2 | | | | 1 | | | |
| PUSCH | | | 1 | 1 | 1 | | | | 2 | 2 | 2 | | | 1 | 1 | 1 | | | 2 | 2 | 2 |

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | S | U | U | D | S | U | U | D | S | U | U | D | S | U | U |
| PHICH | 1 | | | | 2 | | | | | | 1 | | | | 2 | | | | | |
| UL grant | | 2 | | | | | 1 | | | | | | 2 | | | | 1 | | | |
| PUSCH | | | 1 | 1 | 1 | | | | 2 | 2 | 2 | | | 1 | 1 | 1 | | | 2 | 2 | 2 |

The quantity of bundled subframes is 4, there are three processes, three times of retransmission are allowed within 50 ms, and an RTT (round trip time, Round Trip Time) is 20 ms. Compared with the solution in Table 1, the solution in Table 3 has a large time diversity gain.

A value of a timing relationship between the downlink control signaling and the first uplink subframe of the bundled subframe may be obtained according to a value in an existing system. The UE receives the PDCCH/EPDCCH in the subframe n, and transmits the PUSCH in the bundled subframe starting from a subframe n+k, where a value of k is as follows: When n=0 or 5, k=4 or 7; or when n=1 or 6, k=6 or 7.

TABLE 4

Correspondence between values of n and k

| | n | | | | | | | | | |
|---|---|---|---|---|---|---|---|---|---|---|
| | 0 | 1 | 2 | 3 | 4 | 5 | 6 | 7 | 8 | 9 |
| k | 4 or 7 | 6 or 7 | | | | 4 or 7 | 6 or 7 | | | |

A value of a timing relationship between the last uplink subframe in the bundled subframe and a subframe for transmitting the PHICH indicating whether the bundled subframe requires retransmission may be obtained according to a value in an existing system, and according to a timing relationship between a subframe for transmitting the PHICH and the first subframe in a next bundled subframe that is in a same process with the bundled subframe, subframe locations of the next bundled subframe may be determined.

Optionally, the UE receives the PHICH in the subframe n−l, and transmits the PUSCH in the bundled subframe starting from the subframe n+k. When n is 0, a value of l is 5 or 4; when n is 5, a value of l is 4 or 5; when n is 1, a value of l is 1 or 5; or when n is 6, a value of l is 5 or 1.

Optionally, values of n and l may be: When n is 0, l=5, when n is 1, l=1; when n is 5, l=4, or when n is 6, l=5. Whether the value of n is 5 or 6 depends on a value of a bit in a UL index in UL DCI (downlink control information, Downlink Control Information), for example, if a value of an MSB (most significant bit, Most Significant Bit) is 1, the value of n is 6; or if a value of an LSB (least significant bit, Least Significant Bit) is 1, the value of n is 5.

TABLE 5

Correspondence between values of n and l

| | | | | | n | | | | | |
|---|---|---|---|---|---|---|---|---|---|---|
| | 0 | 1 | 2 | 3 | 4 | 5 | 6 | 7 | 8 | 9 |
| l | 5 | 1 | | | | 4 | 5 | | | |

Optionally, the values of n and l may also be: When n is 5, l=5, when n is 6, l=1; when n is 0, l=4, or when n is 1, l=5.

TABLE 6

Correspondence between values of n and l

| | | | | | n | | | | | |
|---|---|---|---|---|---|---|---|---|---|---|
| | 0 | 1 | 2 | 3 | 4 | 5 | 6 | 7 | 8 | 9 |
| l | 4 | 5 | | | | 5 | 1 | | | |

Optionally, two groups of value assignment manners may be defined for n and l. A first group of value assignment manner is shown in Table 7 or Table 8:

TABLE 7

Correspondence between values of n and l in a first group

| | | | | | n | | | | | |
|---|---|---|---|---|---|---|---|---|---|---|
| | 0 | 1 | 2 | 3 | 4 | 5 | 6 | 7 | 8 | 9 |
| l | 5 | 1 | | | | 4 | | | | |

TABLE 8

Correspondence between values of n and l in a first group

| | | | | | n | | | | | |
|---|---|---|---|---|---|---|---|---|---|---|
| | 0 | 1 | 2 | 3 | 4 | 5 | 6 | 7 | 8 | 9 |
| l | 5 | 1 | | | | 5 | | | | |

Whether the value of the subframe n is 5 or 6 depends on a value of a bit in a UL index in UL DCI, for example, if a value of an MSB is 1, the value of n is 6; or if a value of an LSB is 1, the value of n is 5.

A second group of value assignment manner is shown in Table 9 or Table 10:

TABLE 9

Correspondence between values of n and l in a second group

| | | | | | n | | | | | |
|---|---|---|---|---|---|---|---|---|---|---|
| | 0 | 1 | 2 | 3 | 4 | 5 | 6 | 7 | 8 | 9 |
| l | 4 | | | | | 5 | 1 | | | |

TABLE 10

Correspondence between values of n and l in a second group

| | | | | | n | | | | | |
|---|---|---|---|---|---|---|---|---|---|---|
| | 0 | 1 | 2 | 3 | 4 | 5 | 6 | 7 | 8 | 9 |
| l | 5 | | | | | 5 | 1 | | | |

Whether the value of the subframe n is 0 or 1 depends on a value of a bit in a UL index in UL DCI in a corresponding subframe, for example, if a value of an MSB is 1, the value of n is 1; or if a value of an LSB is 1, the value of n is 0.

The value of l in the second group may be indicated by using signaling. The signaling may be higher layer signaling such as RRC signaling or MAC CE (Media Access Control control element, Medium Access Control Control Element) signaling or PDCCH/EPDCCH signaling. The signaling indicates that the bit may be a newly added bit, or an existing bit is reused but a different meaning is assigned to the existing bit. For example, a state 00 or 11 of a UL index in a DCI format is used to indicate which group of value is used, or statuses of UL indexes included in DCI transmitted in different subframes are combined for indication.

Optionally, indication information sent by the base station is received, where the indication information is used for instructing the UE to transmit the PUSCH according to the subframe bundling configuration.

In a conventional technology, an uplink/downlink subframe configuration 3 does not support a subframe bundling transmission manner. According to an existing dynamic scheduling method, under a time latency requirement of 50 ms, there can be a maximum of five subframes for initial transmission and retransmission of one data packet. According to a semi-persistent scheduling method, under the time latency requirement of 50 ms, four UL subframes are available for one data packet. However, there are six UL subframes in total within 20 ms. Therefore, the following rule may be considered to perform subframe bundling configuration for the configuration 3:

supporting VoIP transmission with an interval/period of 20 ms;

a latency requirement (initial transmission or initial transmission+retransmission) being 50 ms; and under a condition of meeting the latency requirement, there being a maximum of six UL subframes used to transmit each VoIP packet.

A value of a timing relationship between downlink scheduling signaling and the first uplink subframe of the bundled uplink subframes may be obtained according to a value in an existing system; and a value of a timing relationship between the last uplink subframe in the bundled subframe and a subframe for transmitting the PHICH indicating whether the bundled subframe requires retransmission may be obtained according to a value in an existing system, and a timing relationship between a subframe for transmitting the PHICH and the first UL subframe in a next bundled subframe that is in a same process with the bundled subframe is determined according to a location of the PHICH.

Optionally, as an embodiment, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

Optionally, the quantity of bundled subframes is 6, and a quantity of HARQ processes or a quantity of subframe bundling configurations of the UE is 1. A specific solution is shown in the following table:

TABLE 12

Uplink/downlink subframe configuration being 3 and the quantity of bundled subframes being 6

| Frame n | | | | | | | | | | Frame n + 1 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | U | D | D | D | D | D | D | S | U | U | U | D | D | D | D | D |

PHICH
UL grant                                                                                                   2
PUSCH          1  1  1                            1  1  1

| Frame n + 2 | | | | | | | | | | Frame n + 3 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | U | D | D | D | D | D | D | S | U | U | U | D | D | D | D | D |

PHICH
UL grant                                                                                                   1
PUSCH          2  2  2                            2  2  2

| Frame n + 4 | | | | | | | | | | Frame n + 5 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | U | D | D | D | D | D | D | S | U | U | U | D | D | D | D | D |

PHICH
UL grant                                                                                                   2
PUSCH          1  1  1                            1  1  1

This solution can better support semi-persistent scheduling transmission with a period of 20 ms or a multiple of 20 ms. Semi-persistent scheduling transmission based on subframe bundling can also be supported. A maximum quantity of available subframes used for each packet is 6, and a latency is less than 50 ms.

A value of a timing relationship between the downlink control signaling and the first uplink subframe of the bundled subframe may be obtained according to a value in an existing system. The UE receives, in the subframe n, downlink scheduling for the bundled subframe (a PDCCH or an EPDCCH), and transmits the PUSCH in the bundled subframe starting from a subframe n+k, where a correspondence between values of n and k is shown in the following table:

TABLE 13

Correspondence between values of n and k

| | n | | | | | | | | | |
|---|---|---|---|---|---|---|---|---|---|---|
| | 0 | 1 | 2 | 3 | 4 | 5 | 6 | 7 | 8 | 9 |
| k | 4 | | | | | | | | 4 | 4 |

Because there is only one HARQ process and there is no retransmission, no PHICH needs to be sent or detected, and a physical layer may set a PHICH state transferred to a higher layer to ACK.

Optionally, the quantity of bundled subframes is less than 6, and a quantity of HARQ processes or a quantity of subframe bundling configurations of the UE is greater than 1, and the method in FIG. 1 may further include: when the UE does not correctly receive the downlink control signaling, determining, by the UE, the bundled subframe according to a PHICH used for instructing the UE to transmit the PUSCH and the subframe bundling configuration, where a receiving subframe of the PHICH is the $l^{th}$ subframe before the subframe n; and transmitting the PUSCH in the bundled subframe.

It should be noted that, the PHICH may indicate whether a previous bundled subframe that is in a same process with the bundled subframe requires retransmission, and if the previous bundled subframe requires retransmission, the PHICH triggers retransmission of the PUSCH, or if the previous bundled subframe requires no retransmission, the PHICH and the downlink control signaling for the PUSCH may jointly trigger initial transmission of the PUSCH.

Optionally, the quantity of bundled subframes is 3, a quantity of HARQ processes or a quantity of subframe bundling configurations of the UE is 2, and n and l meet: when n=0, l=1; when n=9, l=1; or when n=8, l=8. The solution is specifically shown in Table 14:

TABLE 14

Uplink/downlink subframe configuration being 3 and the quantity of bundled subframes being 3

| | | Frame n | | | | | | | | | | Frame n + 1 | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| | | D | S | U | U | U | D | D | D | D | D | D | S | U | U | U | D | D | D | D | D |
| PHICH | | 1 | | | | | | | | | | 2 | | | | | | | | | |
| UL grant | | | | | | | | | 1 | | | | | | | | | | | 2 | |
| PUSCH | | | | 2 | 2 | 2 | | | | | | | | 1 | 1 | 1 | | | | | |

| | | Frame n + 2 | | | | | | | | | | Frame n + 3 | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| | | D | S | U | U | U | D | D | D | D | D | D | S | U | U | U | D | D | D | D | D |
| PHICH | | 1 | | | | | | | | | | 2 | | | | | | | | | |
| UL grant | | | | | | | | | 1 | | | | | | | | | | | 2 | |
| PUSCH | | | | 2 | 2 | 2 | | | | | | | | 1 | 1 | 1 | | | | | |

| | | Frame n + 4 | | | | | | | | | | Frame n + 5 | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| | | D | S | U | U | U | D | D | D | D | D | D | S | U | U | U | D | D | D | D | D |
| PHICH | | 1 | | | | | | | | | | 2 | | | | | | | | | |
| UL grant | | | | | | | | | 1 | | | | | | | | | | | 2 | |
| PUSCH | | | | 2 | 2 | 2 | | | | | | | | 1 | 1 | 1 | | | | | |

A value of a timing relationship between downlink scheduling signaling and the first uplink subframe of the bundled uplink subframes may be obtained according to a value in an existing system. The UE receives, in the subframe n, downlink scheduling for the bundled subframe (a PDCCH or an EPDCCH), and transmits the PUSCH in the bundled subframe starting from a subframe n+k, where a value of k is 4.

A value of a timing relationship between the last uplink subframe in the bundled subframe and a subframe for transmitting a PHICH may be obtained according to a value in an existing system, and a timing relationship of the first subframe in a next bundled subframe that is in a same process with the bundled subframe is determined according to a location of the PHICH. The UE receives the PHICH in the subframe n−l, and transmits the PUSCH in the bundled subframe starting from the subframe n+k. When n is 0, a value of l is 1; when n is 8, a value of l is 8; or when n is 9, a value of l is 1.

Values of n and l are specifically shown in Table 15:

TABLE 15

Correspondence between values of n and l

| n | | | | | | | | | | |
|---|---|---|---|---|---|---|---|---|---|---|
| | 0 | 1 | 2 | 3 | 4 | 5 | 6 | 7 | 8 | 9 |
| l | 1 | | | | | | | | 8 | 1 |

Optionally, the quantity of bundled subframes is 2, a quantity of HARQ processes or a quantity of subframe bundling configurations of the UE is 3, and n and l meet: when n=0, l=2; when n=8, l=9; or when n=9, l=9.

Compared with the foregoing solution, this solution has a larger time diversity gain. A maximum quantity of available subframes used for each packet is 6, and a latency is less than 50 ms.

TABLE 16

Uplink/downlink subframe configuration being 3 and the quantity of bundled subframes being 2

| | | Frame n | | | | | | | | | | Frame n + 1 | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| | | D | S | U | U | U | D | D | D | D | D | D | S | U | U | U | D | D | D | D | D |
| PHICH | | 1 | | | | | | | | | | 3 | | | | | | | | | 2 | |
| UL grant | | 2 | | | | | | | | | | 1 | | | | | | | | | 3 | |
| PUSCH | | | | 3 | 3 | 2 | | | | | | | | 2 | 1 | 1 | | | | | |

| | | Frame n + 2 | | | | | | | | | | Frame n + 3 | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| | | D | S | U | U | U | D | D | D | D | D | D | S | U | U | U | D | D | D | D | D |
| PHICH | | 1 | | | | | | | | | | 3 | | | | | | | | | 2 | |
| UL grant | | 2 | | | | | | | | | | 1 | | | | | | | | | 3 | |
| PUSCH | | | | 3 | 3 | 2 | | | | | | | | 2 | 1 | 1 | | | | | |

TABLE 16-continued

Uplink/downlink subframe configuration being 3 and the quantity of bundled subframes being 2

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | D | D | D | D | D | S | U | U | U | D | D | D | D | D |
| PHICH | 1 | | | | | | | | | | 3 | | | | | | | | 2 | |
| UL grant | 2 | | | | | | | | | | 1 | | | | | | | | | |
| PUSCH | | | 3 | 3 | 2 | | | | | | | | 2 | 1 | 1 | | | | | |

A value of a timing relationship between downlink scheduling signaling and the first uplink subframe of the bundled uplink subframes is obtained according to a value in an existing system. The UE receives, in the subframe n, downlink scheduling for the bundled subframe, that is, a PDCCH/EPDCCH, and transmits the PUSCH in the bundled subframe starting from a subframe n+k. For a value of k, refer to the following table.

A value of a timing relationship of a PHICH corresponding to the last uplink subframe in the bundled subframe may be obtained according to a value in an existing system, and a timing relationship of the first subframe in a next bundled subframe that is in a same process with the bundled subframe is determined according to a location of the PHICH. The UE receives the PHICH in the subframe n−l, and transmits the PUSCH in the bundled subframe starting from the subframe n+k. When n is 0, a value of l is 2; when n is 8, a value of l is 9; or when n is 9, a value of l is 9.

A correspondence between values of n and l are specifically shown in Table 17:

TABLE 17

Correspondence between values of n and l

| | n | | | | | | | | | |
|---|---|---|---|---|---|---|---|---|---|---|
| | 0 | 1 | 2 | 3 | 4 | 5 | 6 | 7 | 8 | 9 |
| l | 2 | | | | | | | | 9 | 9 |

For an uplink/downlink subframe configuration 6 in a conventional technology, the following rule may be considered to perform subframe bundling configuration:
- supporting VoIP transmission with an interval/period of 20 ms;
- a latency requirement (initial transmission or initial transmission+retransmission) being 50 ms or about 50 ms; and
- under a condition of meeting the latency requirement, there being a maximum of 10 subframes used to transmit each VoIP packet.

Optionally, a current uplink/downlink subframe configuration is the configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

Optionally, the quantity of bundled subframes is 10. This solution can better support semi-persistent scheduling transmission with a period of 20 ms or a multiple of 20 ms. Semi-persistent scheduling transmission based on subframe bundling can also be supported. A maximum quantity of available UL subframes used for each packet is 10, and a latency is less than 50 ms.

Optionally, a quantity of HARQ processes or a quantity of subframe bundling configurations of the UE is 1, and the bundled subframe is 10 consecutive uplink subframes in the configuration 6. A specific solution is shown in Table 18:

TABLE 18

Uplink/downlink subframe configuration being 6 and the quantity of bundled subframes being 10

| | Frame n | | | | | | | | | | Frame n + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | 2 | | | | |
| PUSCH | | | 1 | 1 | 1 | | | 1 | 1 | | | | 1 | 1 | 1 | | | 1 | 1 | |

| | Frame n + 2 | | | | | | | | | | Frame n + 3 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | 1 | | | | |
| PUSCH | | | 2 | 2 | 2 | | | 2 | 2 | | | | 2 | 2 | 2 | | | 2 | 2 | |

TABLE 18-continued

Uplink/downlink subframe configuration being 6 and the quantity of bundled subframes being 10

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | 2 | | | | |
| PUSCH | | | 1 | 1 | 1 | | | 1 | 1 | | | | 1 | 1 | 1 | | | 1 | 1 | |

A value of a timing relationship between downlink scheduling signaling and the first uplink subframe of the bundled uplink subframes is obtained according to a value in an existing system. The UE receives, in the subframe n, downlink scheduling for the bundled subframe, that is, a PDCCH/EPDCCH, and transmits the PUSCH in the bundled subframe starting from a subframe n+k. When n is 0, 1, 5, or 6, a value of k is 7; or when n is 9, a value of k is 5.

For a specific correspondence, refer to the following table:

TABLE 19

Correspondence between values of n and k

| | n | | | | | | | | | |
|---|---|---|---|---|---|---|---|---|---|---|
| | 0 | 1 | 2 | 3 | 4 | 5 | 6 | 7 | 8 | 9 |
| k | 7 | 7 | | | | 7 | 7 | | | 5 |

Because there is only one process and there is no retransmission, no PHICH needs to be sent or detected, and a physical layer may set a PHICH state transferred to a higher layer to ACK.

Optionally, a quantity of HARQ processes or a quantity of subframe bundling configurations of the UE is 2, and an interval of one uplink subframe exists between adjacent subframes in the bundled subframe.

In this solution, non-consecutive subframes are bundled, there are two HARQ processes or two subframe bundling configurations, and there is no retransmission. Specifically, subframes in the two HARQ processes or the two subframe bundling configurations are mutually alternate. A value of an interval between subframes in each process or subframe bundling configuration may be obtained from {2, 4, 5}.

When the UE receives a UL grant in the subframe n, the UE transmits the PUSCH starting from a subframe n+k (the first subframe in the bundled subframe), where a value of k is 7 or 5, and a time diversity in this solution is 26 ms. Because a maximum quantity of subframes within 20 ms are used as the bundled subframe and there is no retransmission, no PHICH needs to be sent or detected, and a physical layer may set a PHICH state transferred to a higher layer to ACK. A specific solution is shown in Table 20:

TABLE 20

Uplink/downlink subframe configuration being 6 and the quantity of bundled subframes being 2

| | Frame n | | | | | | | | | | Frame n + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | | 2 | | | |
| PUSCH | | | 1 | 2 | 1 | | | 2 | 1 | | | | 2 | 1 | 2 | | | 1 | 2 | |

| | Frame n + 2 | | | | | | | | | | Frame n + 3 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | | 1 | | | |
| PUSCH | | | 1 | 2 | 1 | | | 2 | 1 | | | | 2 | 1 | 2 | | | 1 | 2 | |

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | | 2 | | | |
| PUSCH | | | 1 | 2 | 1 | | | 2 | 1 | | | | 2 | 1 | 2 | | | 1 | 2 | |

TABLE 20-continued

Uplink/downlink subframe configuration being 6 and the quantity of bundled subframes being 2

| | Frame n + 6 | | | | | | | | | | Frame n + 7 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | 1 | | | | | | | | | | |
| UL grant | | | | | | | | | | | | | | | | | | | | |
| PUSCH | | | 1 | 2 | 1 | | | 2 | 1 | | | | 2 | 1 | 2 | | | 1 | 2 | |

Optionally, a quantity of HARQ processes or a quantity of subframe bundling configurations of the UE is 3, and an interval of four uplink subframes exists between adjacent subframes in the bundled subframe.

Non-consecutive uplink subframes are bundled (that is, the bundled subframe is not consecutive uplink subframes; it should be noted that, in a TDD system, consecutive uplink subframes are not surely consecutive subframes), there are three HARQ processes or three subframe bundling configurations, and there is no retransmission. The bundled subframe is 10 uplink subframes, each two consecutive uplink subframe form a subframe group, and an uplink subframe occupied by another process exists between different subframe groups. A value of an interval between subframes in each HARQ process or subframe bundling configuration is obtained from {1, 3, 4}. Subframe groups in the three HARQ processes or the three subframe bundling configurations are mutually alternate. For example, a sequence of subframes in the three subframe bundling configurations is: a subframe group in a subframe bundling configuration 1, a subframe group in a subframe bundling configuration 2, and a subframe group in a subframe bundling configuration 3, and then the foregoing process is repeated. A subframe interval between different groups in the three HARQ processes or the three subframe bundling configurations is 11 ms. The UE receives a UL grant in the subframe n, and sends the PUSCH in a subframe n+k (the subframe n+k is the first subframe in the bundled subframe), where k is 7 or 5, and a time diversity is 51 ms. A specific solution is shown in Table 21:

TABLE 21

Uplink/downlink subframe configuration being 6 and the quantity of bundled subframes being 10

| | Frame n | | | | | | | | | | Frame n + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | 3 | | | | |
| PUSCH | | | 1 | 1 | 2 | | | 2 | 3 | | | | 3 | 1 | 1 | | | 2 | 2 | |

| | Frame n + 2 | | | | | | | | | | Frame n + 3 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | 2 | | | | |
| PUSCH | | | 3 | 3 | 1 | | | 1 | 2 | | | | 2 | 3 | 3 | | | 1 | 1 | |

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | | | | | | | | | | |
| UL grant | | | | | | | | | | | | | | | | 1 | | | | |
| PUSCH | | | 2 | 2 | 3 | | | 3 | 1 | | | | 1 | 2 | 2 | | | 3 | 3 | |

Optionally, the quantity of bundled subframes is less than 10, and a quantity of HARQ processes or a quantity of subframe bundling configurations of the UE is greater than 1, and when the UE does not correctly receive the downlink control signaling, the UE determines the bundled subframe according to a PHICH used for instructing the UE to transmit the PUSCH and the subframe bundling configuration, where a receiving subframe of the PHICH is the $1^{th}$ subframe before the subframe n; and transmits the PUSCH in the bundled subframe.

It should be noted that, the PHICH may also indicate whether a previous bundled subframe that is in a same process with the bundled subframe requires retransmission, and if the previous bundled subframe requires retransmission, the PHICH triggers retransmission of the PUSCH, or if the previous bundled subframe requires no retransmission, the PHICH and the downlink control signaling for the PUSCH jointly trigger initial transmission of the PUSCH.

Optionally, the quantity of bundled subframes is 5, a quantity of HARQ processes or a quantity of subframe bundling configurations of the UE is 2, and n and l meet: when n=0, l=0; when n=1, l=0; when n=5, l=0; when n=6, l=0; or when n=9, l=0. The solution is specifically shown in Table 22:

TABLE 22

Uplink/downlink subframe configuration being 6 and the quantity of bundled subframes being 5

| | Frame n | | | | | | | | | Frame n + 1 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | 2 | | | | | | | | | | 1 | | | |
| UL grant | | | | | | | 2 | | | | | | | | | | 1 | | | |
| PUSCH | | | 1 | 1 | 1 | | | 1 | 1 | | | | 2 | 2 | 2 | | | 2 | 2 | |

| | Frame n + 2 | | | | | | | | | Frame n + 3 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | 2 | | | | | | | | | | 1 | | | |
| UL grant | | | | | | | 2 | | | | | | | | | | 1 | | | |
| PUSCH | | | 1 | 1 | 1 | | | 1 | 1 | | | | 2 | 2 | 2 | | | 2 | 2 | |

| | Frame n + 4 | | | | | | | | | Frame n + 5 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | 2 | | | | | | | | | | 1 | | | |
| UL grant | | | | | | | 2 | | | | | | | | | | 1 | | | |
| PUSCH | | | 1 | 1 | 1 | | | 1 | 1 | | | | 2 | 2 | 2 | | | 2 | 2 | |

A value of a timing relationship between downlink scheduling signaling and the first uplink subframe of the bundled uplink subframes is obtained according to a value in an existing system. The UE receives, in the subframe n, downlink scheduling for the bundled subframe, that is, a PDCCH/EPDCCH, and transmits the PUSCH in the bundled subframe starting from a subframe n+k.

A value of a timing relationship of a PHICH corresponding to the last uplink subframe in the bundled subframe may be obtained according to a value in an existing system, and a timing relationship of the first subframe in a next bundled subframe that is in a same process with the bundled subframe is determined according to a location of the PHICH. The UE receives the PHICH in the subframe n−l, and transmits the PUSCH in the bundled subframe starting from the subframe n+k. When n is 0, 1, 5, 6, or 9, a value of l is 0. Specifically, for a correspondence between values of n and l, refer to the following table:

TABLE 23

Correspondence between values of n and l

| n | 0 | 1 | 2 | 3 | 4 | 5 | 6 | 7 | 8 | 9 |
|---|---|---|---|---|---|---|---|---|---|---|
| l | 0 | 0 | | | | 0 | 0 | | | 0 |

Optionally, the quantity of bundled subframes is 2, a quantity of HARQ processes or a quantity of subframe bundling configurations of the UE is 3, and n and l meet: when n=0, l=−1; when n=5, l=−1; when n=9, l=−1; when n=1, l=−4; or when n=6, l=−3. It should be noted that, the value of l being negative may indicate that the subframe n−l is located after the subframe n. A specific solution is shown in Table 24:

TABLE 24

Uplink/downlink subframe configuration being 6 and the quantity of bundled subframes being 2

| | Frame n | | | | | | | | | Frame n + 1 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | | | | | | | 2 | | 3 | | | | 1 | | | |
| UL grant | | 1 | | | | | 2 | | | | | 3 | | | | 1 | | | | 2 |
| PUSCH | | | 2 | 2 | 3 | | | 3 | 1 | | | | 1 | 2 | 2 | | | 3 | 3 | |

| | Frame n + 2 | | | | | | | | | Frame n + 3 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | 2 | | | | | 3 | | | | | 1 | | 2 | | | | 3 | | | |
| UL grant | | 3 | | | | | 1 | | | | | 2 | | | | 3 | | | | 1 |
| PUSCH | | | 1 | 1 | 2 | | | 2 | 3 | | | | 3 | 1 | 1 | | | 2 | 2 | |

TABLE 24-continued

Uplink/downlink subframe configuration being 6 and the quantity of bundled subframes being 2

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | 1 | | | | 2 | | | | 3 | 1 | | | | | 2 | | | | | |
| UL grant | | 2 | | | | 3 | | | | 1 | | | | | | 2 | | | | |
| PUSCH | | | 3 | 3 | 1 | | | 1 | 2 | | | | 2 | 3 | 3 | | | 1 | 1 | |

In this solution, a value (ms) of an RTT between the HARQ processes may be 11, 11, 13, 11, or 14. Within a latency requirement of 50 ms, a maximum quantity of available subframes for one VoIP data packet is a quantity for initial transmission plus three times of retransmission and is 8. If the latency requirement is slightly lenient, for example, 51 ms, a quantity of available subframes for one VoIP data packet is a quantity for initial transmission plus four times of retransmission and is 10. In addition, it can be seen from the table that a processing time from some PHICHs to the PUSCH is 2 ms, which may lead to heavier processing burden.

Therefore, for the UL/DL configuration 6, when a latency of 51 ms can meet a requirement, a maximum quantity of available subframes for one VoIP packet is 10. Compared with the solution in Table 22, this solution has a larger time diversity gain.

A value of a timing relationship between downlink scheduling signaling and the first uplink subframe of the bundled uplink subframes is obtained according to a value in an existing system. The UE receives, in the subframe n, downlink scheduling for the bundled subframe, that is, a PDCCH/EPDCCH, and transmits the PUSCH in the bundled subframe starting from a subframe n+k. When n is 0, 1, 5, or 6, a value of k is 7; or when n is 9, a value of k is 5.

A value of a timing relationship of a PHICH corresponding to the last uplink subframe in the bundled subframe is obtained according to a value in an existing system, and a timing relationship of the first subframe in a next bundled subframe that is in a same process with the bundled subframe is determined according to a location of the PHICH. The UE receives the PHICH in the subframe n−l, and correspondingly, transmits the PUSCH in the bundled subframe starting from the subframe n+k. When n is 0, 5, or 9, a value of l is −1; when n is 1, a value of l is −4; or when n is 6, a value of l is −3.

In a conventional technology, a time diversity of a TDD UL/DL configuration 1 (an uplink/downlink subframe configuration 1) is not sufficient. Therefore, the following solution is considered to enhance the TDD UL/DL configuration 1, and in the solution, the following factors are mainly considered:

transmission of one PUSCH including initial transmission and retransmission meets a transmission latency requirement of about 50 ms;

a time diversity is maximized within a latency range; and a maximum quantity of available subframes is a quantity of subframes included within 20 ms.

Optionally, a current uplink/downlink subframe configuration is the configuration 1, the quantity of bundled subframes is 2, a quantity of HARQ processes or a quantity of subframe bundling configurations is 3, and a start subframe of the bundled subframe is the $k^{th}$ subframe located after the subframe n, and when the UE does not correctly receive the downlink control signaling, the UE determines the bundled subframe according to a PHICH used for instructing the UE to transmit the PUSCH and the subframe bundling configuration, where a receiving subframe of the PHICH is the $l^{th}$ subframe before the subframe n; and transmits the PUSCH in the bundled subframe. The solution is specifically shown in the following table:

In the TDD UL/DL configuration 1, two subframes are bundled (the quantity of bundled subframes is 2), there are three HARQ processes or three subframe bundling configurations, and a time diversity of the TDD UL/DL configuration 1 may reach 46 ms. A timing difference from a UL grant to a PUSCH is 6 ms or 4 ms, that is, the UE receives the UL grant or a PHICH in the subframe n, and sends the PUSCH in a subframe n+k (the first subframe in the bundled subframe), where k=6 or 4.

Optionally, based on the first timing relationship and the second timing relationship, n, l, and k meet: when n=6, k=6 and l=2; or when n=1, k=6 and l=2. A specific solution is shown in Table 25:

TABLE 25

Uplink/downlink subframe configuration being 1 and the quantity of bundled subframes being 2

| | Frame n | | | | | | | | | | Frame n + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | S | U | U | D | D | S | U | U | D | D | S | U | U | D |
| PHICH | | | | | | | 2 | | | 3 | | | | | | | 1 | | | 2 |
| UL grant | | 1 | | | | 2 | | | | | 3 | | | | | 1 | | | | |
| PUSCH | | | 3 | 3 | | | | 1 | 1 | | | | 2 | 2 | | | | 3 | 3 | |

TABLE 25-continued

Uplink/downlink subframe configuration being 1 and the quantity of bundled subframes being 2

| | | | | Frame n + 2 | | | | | | | | | | Frame n + 3 | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | S | U | U | D | D | S | U | U | D | D | S | U | U | D |
| PHICH | | | | 3 | | | | | | 1 | | | | | 2 | | | | | 3 |
| UL grant | | 2 | | | | 3 | | | | | | 1 | | | | | 2 | | | |
| PUSCH | | | 1 | 1 | | | | 2 | 2 | | | | 3 | 3 | | | | 1 | 1 | |

| | | | | Frame n + 4 | | | | | | | | | | Frame n + 5 | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | S | U | U | D | D | S | U | U | D | D | S | U | U | D |
| PHICH | | | | 1 | | | | | | 2 | | | | 3 | | | | | | 1 |
| UL grant | | 3 | | | | 1 | | | | | | 2 | | | | 3 | | | | |
| PUSCH | | | 2 | 2 | | | | 3 | 3 | | | | 1 | 1 | | | | 2 | 2 | |

| | | | | Frame n + 6 | | | | | | | | | | Frame n + 7 | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | S | U | U | D | D | S | U | U | D | D | S | U | U | D |
| PHICH | | | | 2 | | | | | | 3 | | | | 1 | | | | | | 2 |
| UL grant | | 1 | | | | 2 | | | | | | 3 | | | | 1 | | | | |
| PUSCH | | | 3 | 3 | | | | 1 | 1 | | | | 2 | 2 | | | | 3 | 3 | |

Optionally, based on the first timing relationship and the second timing relationship, n, k, and l meet: when n=4, k=4 and l=3; or when n=9, k=4 and l=3. A specific solution is shown in Table 26:

Optionally, a current uplink/downlink subframe configuration is the configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, the quantity of bundled subframes is 1, and the method in FIG. 1 may further include: receiving, in the (l+k) subframe after the subframe n, a PHICH used for indicating whether the PUSCH needs to be retransmitted, where n, k, and l meet: when n=3, k=4 and l=11; or when n=8, k=4 and l=11. The solution is specifically shown in the following table:

TABLE 26

Uplink/downlink subframe configuration being 1 and the quantity of bundled subframes being 2

| | | | | Frame n | | | | | | | | | | Frame n + 1 | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | S | U | U | D | D | S | U | U | D | D | S | U | U | D |
| PHICH | | | | | | | 1 | | | | | | | | 2 | | | 3 | | |
| UL grant | | | | 3 | | | | | | 1 | | | | 2 | | | | | | 3 |
| PUSCH | | | 1 | 2 | | | | 2 | 3 | | | | 3 | 1 | | | | 1 | 2 | |

| | | | | Frame n + 2 | | | | | | | | | | Frame n + 3 | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | S | U | U | D | D | S | U | U | D | D | S | U | U | D |
| PHICH | | 1 | | | | 2 | | | | | | | | 3 | | | | 1 | | |
| UL grant | | | | | 1 | | | | | 2 | | | | | 3 | | | | | 1 |
| PUSCH | | | 2 | 3 | | | | 3 | 1 | | | | 1 | 2 | | | | 2 | 3 | |

| | | | | Frame n + 4 | | | | | | | | | | Frame n + 5 | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | S | U | U | D | D | S | U | U | D | D | S | U | U | D |
| PHICH | | 2 | | | | 3 | | | | | | | | 1 | | | | 2 | | |
| UL grant | | | | 2 | | | | | | 3 | | | | 1 | | | | | | 2 |
| PUSCH | | | 3 | 1 | | | | 1 | 2 | | | | 2 | 3 | | | | 3 | 1 | |

In a conventional technology, a time diversity of a TDD UL/DL configuration 2 (an uplink/downlink subframe configuration 2) is not sufficient. Therefore, two solutions are considered to enhance the TDD UL/DL configuration 2:

transmission of one PUSCH including initial transmission and retransmission meets a transmission latency requirement of about 50 ms;

a time diversity is maximized within a latency range; and a maximum quantity of available subframes is a quantity of subframes included within 20 ms.

TABLE 27

Uplink/downlink subframe configuration being 2 and the quantity of bundled subframes being 1

| | Frame n | | | | | | | | | | Frame n + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | D | D | D | S | U | D | D | D | S | U | D | D | D | S | U | D | D |
| PHICH | | | | 2 | | | | 3 | | | | | | 1 | | | | 2 | | |
| UL grant | | | | 2 | | | | 3 | | | | | | 1 | | | | 2 | | |
| PUSCH | | | 1 | | | | | | 2 | | | | 3 | | | | | | 1 | |

| | Frame n + 2 | | | | | | | | | | Frame n + 3 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | D | D | D | S | U | D | D | D | S | U | D | D | D | S | U | D | D |
| PHICH | | | | 3 | | | | 1 | | | | | | 2 | | | | 3 | | |
| UL grant | | | | 3 | | | | 1 | | | | | | 2 | | | | 3 | | |
| PUSCH | | | 2 | | | | | | 3 | | | | 1 | | | | | | 2 | |

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | D | D | D | S | U | D | D | D | S | U | D | D | D | S | U | D | D |
| PHICH | | | | 1 | | | | 2 | | | | | | 3 | | | | 1 | | |
| UL grant | | | | 1 | | | | 2 | | | | | | 3 | | | | 1 | | |
| PUSCH | | | 3 | | | | | | 1 | | | | 2 | | | | | | 3 | |

In this solution, different from an existing RTT value of 10, an RTT value is 15, and a quantity of HARQ processes or a quantity of subframe bundling configurations is 3. It can be seen from Table 27 that a time diversity of one PUSCH after initial transmission and retransmission may reach 45 ms, and a timing difference from a UL grant to a PUSCH is 4 ms. That is, the UE receives the UL grant or a PHICH in the subframe n, and sends the PUSCH in a subframe n+4. A timing difference from a PUSCH to a PHICH is 11 ms. That is, the UE sends the PUSCH in the subframe n, and receives the PHICH in a subframe n+11. This method of changing an RTT value or changing timing from a PUSCH to a PHICH needs to be indicated by using signaling, so as to instruct the UE to perform HARQ transmission by using a changed RTT.

Optionally, the quantity of bundled subframes is 4, an interval of two uplink subframes exists between adjacent subframes in the bundled subframe. Based on the first timing relationship, n and k meet: when n=8, k=4. The solution is specifically shown in Table 28:

TABLE 28

Uplink/downlink subframe configuration being 2 and the quantity of bundled subframes being 4

| | Frame n | | | | | | | | | | Frame n + 1 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | D | D | D | S | U | D | D | D | S | U | D | D | D | S | U | D | D |
| PHICH | | | | | | | | | | | | | | | | | | | 2 | |
| UL grant | | | | | | | | | | | | | | | | | | | 2 | |
| PUSCH | | | 1 | | | | | 2 | | | | | | 3 | | | | 1 | | |

| | Frame n + 2 | | | | | | | | | | Frame n + 3 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | D | D | D | S | U | D | D | D | S | U | D | D | D | S | U | D | D |
| PHICH | | | | | | | | | | | | | | | | | | | 3 | |
| UL grant | | | | | | | | | | | | | | | | | | | 3 | |
| PUSCH | | | 2 | | | | | 3 | | | | | | 1 | | | | 2 | | |

| | Frame n + 4 | | | | | | | | | | Frame n + 5 | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | D | D | D | S | U | D | D | D | S | U | D | D | D | S | U | D | D |
| PHICH | | | | | | | | | | | | | | | | | | | 1 | |
| UL grant | | | | | | | | | | | | | | | | | | | 1 | |
| PUSCH | | | 3 | | | | | 1 | | | | | | 2 | | | | 3 | | |

According to the solution in Table 28, non-consecutive subframes are used for subframe bundling, an interval between non-consecutive subframes is 15 ms, the quantity of bundled subframes is 4, and a quantity of HARQ processes is 3 or a quantity of subframe bundling configurations is 3. It can be seen from the table that a time diversity of one PUSCH after transmission in the bundled subframe may reach 45 ms.

In addition, the UE receives a UL grant in the subframe n, and sends the PUSCH in a subframe n+4. Because a maximum quantity of subframes within a latency requirement are used in each subframe bundling process, in each bundled subframe group, no HARQ retransmission is required, no PHICH needs to be sent or detected, and a physical layer may set a PHICH state or an HARQ feedback state of the PUSCH to ACK, where the PHICH state or the HARQ feedback state of the PUSCH is transferred to a higher layer.

In a conventional technology, a time diversity of a TDD UL/DL configuration 4 (an uplink/downlink subframe configuration 4) is not sufficient. Therefore, two solutions are considered to enhance the TDD UL/DL configuration 4:

transmission of one PUSCH including initial transmission and retransmission meets a transmission latency requirement of about 50 ms;

a time diversity is maximized within a latency range; and a maximum quantity of available subframes is a quantity of subframes included within 20 ms.

Optionally, a current uplink/downlink subframe configuration is the configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, the quantity of bundled subframes is 1, and when the UE does not correctly receive the downlink control signaling, the UE determines the bundled subframe according to a PHICH used for instructing the UE to transmit the PUSCH and the subframe bundling configuration, where a receiving subframe of the PHICH is the $l^{th}$ subframe before the subframe n; and transmits the PUSCH in the bundled subframe, where n, l, and k meet: when n=8, k=4 and l=0; or when n=9, k=4 and l=0. The solution is specifically shown in Table 29:

TABLE 29

Uplink/downlink subframe configuration being 4 and the quantity of bundled subframes being 1

| | Frame n | | | | | | | | | Frame n + 1 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | D | D | D | D | D | S | U | U | D | D | D | D | D | D |
| PHICH | | | | | | | | | 2 | 1 | | | | | | | | | 3 | 2 |
| UL grant | | | | | | | | | 2 | 1 | | | | | | | | | 3 | 2 |
| PUSCH | | | 1 | 3 | | | | | | | | | 2 | 1 | | | | | | |

| | Frame n + 2 | | | | | | | | | Frame n + 3 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | D | D | D | D | D | S | U | U | D | D | D | D | D | D |
| PHICH | | | | | | | | | 1 | 3 | | | | | | | | | 2 | 1 |
| UL grant | | | | | | | | | 1 | 3 | | | | | | | | | 2 | 1 |
| PUSCH | | | 3 | 2 | | | | | | | | | 1 | 3 | | | | | | |

| | Frame n + 4 | | | | | | | | | Frame n + 5 | | | | | | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | D | D | D | D | D | D | D | S | U | U | D | D | D | D | D | D |
| PHICH | | | | | | | | | 3 | 2 | | | | | | | | | 1 | 3 |
| UL grant | | | | | | | | | 3 | 2 | | | | | | | | | 1 | 3 |
| PUSCH | | | 2 | 1 | | | | | | | | | 3 | 2 | | | | | | |

In this solution, an existing RTT value is changed, the RTT value is changed from 11 ms to 19 ms, and a quantity of HARQ processes is 3. It can be seen from Table 29 that a time diversity of one PUSCH after initial transmission and retransmission may reach 41 ms, and a timing difference from a UL grant to a PUSCH is 4 ms. The UE receives the UL grant or a PHICH in the subframe n, and sends the PUSCH in a subframe n+4, where n=8, or 9. A timing difference from a PUSCH to a PHICH is 7 or 15 ms. The UE sends the PUSCH in a subframe n=2, and receives the PHICH in a subframe n+7; or the UE sends the PUSCH in a subframe n=3, and receives the PHICH in a subframe n+15. This method of changing an RTT needs to be indicated by using signaling, so as to instruct the UE to perform HARQ transmission by using a changed RTT.

Optionally, the quantity of bundled subframes is 4, an interval of two uplink subframes exists between adjacent subframes in the bundled subframe. Based on the first timing relationship, n and k meet: when n=8, k=4. Details are shown in the following table:

TABLE 30

Uplink/downlink subframe configuration being 4 and the quantity of bundled subframes being 4

| Frame n | | | | | | | | | | Frame n + 1 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | D | D | D | D | D | D | D | S | U | U | D | D | D | D | D | D |

| PHICH | | | | | | | | | | | | | | | | | | | |
| UL grant | | | | | | | | | | | | | | | | | | 2 | |
| PUSCH | | 1 | 2 | | | | | | | | | | 3 | 1 | | | | | |

| Frame n + 2 | | | | | | | | | | Frame n + 3 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | D | D | D | D | D | D | D | S | U | U | D | D | D | D | D | D |

| PHICH | | | | | | | | | | | | | | | | | | | |
| UL grant | | | | | | | | | | | | | | | | | | 3 | |
| PUSCH | | 2 | 3 | | | | | | | | | | 1 | 2 | | | | | |

| Frame n + 4 | | | | | | | | | | Frame n + 5 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | D | D | D | D | D | D | D | S | U | U | D | D | D | D | D | D |

| PHICH | | | | | | | | | | | | | | | | | | | |
| UL grant | | | | | | | | | | | | | | | | | | 1 | |
| PUSCH | | 3 | 1 | | | | | | | | | | 2 | 3 | | | | | |

| Frame n + 6 | | | | | | | | | | Frame n + 7 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | U | D | D | D | D | D | D | D | S | U | U | D | D | D | D | D | D |

| PHICH | | | | | | | | | | | | | | | | | | | |
| UL grant | | | | | | | | | | | | | | | | | | 2 | |
| PUSCH | | 1 | 2 | | | | | | | | | | 3 | 1 | | | | | |

In this solution, non-consecutive subframes are used for subframe bundling, and intervals of 11 and 19 ms exist between non-consecutive subframes. The quantity of bundled subframes is 4. A quantity of HARQ processes is 3 or a quantity of subframe bundling configurations is 3. Different numbers represent different HARQ processes or different subframe bundling configurations. It can be seen from Table 30 that a time diversity of one PUSCH after transmission in the bundled subframe may reach 41 ms. Intervals between four bundled subframes may be 11, 19, and 11 ms, or may be 19, 11, and 19 ms. In addition, the UE receives a UL grant in the subframe n, and sends the PUSCH in a subframe n+4. In addition, because a maximum quantity of subframes within a latency requirement are used in each subframe bundling process, in each bundled subframe group, no HARQ retransmission is required, no PHICH needs to be sent or detected, and a physical layer may set a PHICH state or an HARQ feedback state of the PUSCH to ACK, where the PHICH state or the HARQ feedback state of the PUSCH is transferred to a higher layer.

In a conventional technology, a time diversity of a TDD UL/DL configuration (uplink/downlink subframe configuration) 5 is not sufficient. Therefore, the following solution is considered to enhance the TDD UL/DL configuration 5:

retransmission meets a transmission latency requirement of about 50 ms;

a time diversity is maximized within a latency range; and a maximum quantity of available subframes is a quantity of subframes included within 20 ms.

Optionally, a current uplink/downlink subframe configuration is the configuration 5, a quantity of subframes available for transmitting the PUSCH is 2, and the quantity of bundled subframes is 2.

Optionally, a quantity of HARQ processes or a quantity of subframe bundling configurations of the UE is 4, and an interval of three uplink subframes exists between a previous subframe and a next subframe in the bundled subframe. A specific solution is shown in the following table:

TABLE 31

Uplink/downlink subframe configuration being 5 and the quantity of bundled subframes being 2

| Frame n | | | | | | | | | | Frame n + 1 | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | D | D | D | D | D | D | D | D | S | U | D | D | D | D | D | D | D |

| PHICH | | | | | | | | | | | | | | | | | | | |
| UL grant | | | | | | | | | | | | | | | | | | | 3 |
| PUSCH | | | 1 | | | | | | | | | | 2 | | | | | | |

TABLE 31-continued

| Uplink/downlink subframe configuration being 5 and the quantity of bundled subframes being 2 | | | | | | | | | | | | | | | | | | | |
|---|---|---|---|---|---|---|---|---|---|---|---|---|---|---|---|---|---|---|---|
| Frame n + 2 | | | | | | | | | Frame n + 3 | | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | D | D | D | D | D | D | D | D | S | U | D | D | D | D | D | D | D |
| PHICH | | | | | | | | | | | | | | | | | | | |
| UL grant | | | | | | | | | | | | | | | | | | 5 | |
| PUSCH | | 3 | | | | | | | | | | 4 | | | | | | | |
| Frame n + 4 | | | | | | | | | Frame n + 5 | | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | D | D | D | D | D | D | D | D | S | U | D | D | D | D | D | D | D |
| PHICH | | | | | | | | | | | | | | | | | | | |
| UL grant | | | | | | | | | | | | | | | | | | 2 | |
| PUSCH | | 5 | | | | | | | | | | 1 | | | | | | | |

In this solution, non-consecutive subframes are used for subframe bundling, and an interval of 50 ms exists between non-consecutive subframes. The quantity of bundled subframes is 2. A quantity of HARQ processes is 5 or a quantity of subframe bundling configurations is 5. Different numbers represent different HARQ processes or different subframe bundling configurations. It can be seen from the figure that a time diversity of one PUSCH after transmission in the bundled subframe may reach 51 ms.

Optionally, a quantity of HARQ processes of the UE is 4, and an interval of three uplink subframes exists between a previous subframe and a next subframe in the bundled subframe. A specific solution is shown in Table 32:

TABLE 32

| Uplink/downlink subframe configuration being 5 and the quantity of bundled subframes being 2 | | | | | | | | | | | | | | | | | | | |
|---|---|---|---|---|---|---|---|---|---|---|---|---|---|---|---|---|---|---|---|
| Frame n | | | | | | | | | Frame n + 1 | | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | D | D | D | D | D | D | D | D | S | U | D | D | D | D | D | D | D |
| PHICH | | | | | | | | | | | | | | | | | | | |
| UL grant | | | | | | | | | | | | | | | | | | 3 | |
| PUSCH | | 1 | | | | | | | | | | 2 | | | | | | | |
| Frame n + 2 | | | | | | | | | Frame n + 3 | | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | D | D | D | D | D | D | D | D | S | U | D | D | D | D | D | D | D |
| PHICH | | | | | | | | | | | | | | | | | | | |
| UL grant | | | | | | | | | | | | | | | | | | | |
| PUSCH | | 3 | | | | | | | | | | 4 | | | | | | | |
| Frame n + 4 | | | | | | | | | Frame n + 5 | | | | | | | | | | |
| 0 | 1 | 2 | 3 | 4 | 5 | 6 | 7 | 8 | 9 | 0 | 1 | 2 | 3 | 4 | 5 | 6 | 7 | 8 | 9 |
| D | S | U | D | D | D | D | D | D | D | D | S | U | D | D | D | D | D | D | D |
| PHICH | | | | | | | | | | | | | | | | | | | |
| UL grant | | | | | | | | 2 | | | | | | | | | | | |
| PUSCH | | 1 | | | | | | | | | | 2 | | | | | | | |

Optionally, the subframe bundling configuration is set to allow a quantity of subframes available for transmitting the PUSCH under a condition of meeting a requirement of a transmission latency to be equal to a quantity of uplink subframes in a semi-persistent scheduling period.

During semi-persistent scheduling SPS configuration, for a TDD UL/DL configuration 1:

When subframe bundling configuration is performed as in a prior-art configuration in which four subframes are bundled, semi-persistent scheduling is not supported in the prior-art subframe bundling configuration, because when a semi-persistent scheduling period of 20 ms is used in a case of a packet transmission interval of 20 ms, an initially transmitted PUSCH such as a packet b collides with a previous PUSCH in HARQ retransmission such as a packet a. Therefore, a method of performing subframe offset for the existing period may be considered for use. As shown in the following figure, two offset values are configured and used in a semi-persistent scheduling period. For adjacent UL subframes for SPS grant scheduling on which subframe bundling is configured, different offset values +10 and −10 are set. For example, an offset value for subframes of an odd-numbered frame is +10 and an offset value for subframes of an even-numbered frame is −10, or vice versa. Corresponding SPS periods are 30 ms and 10 ms. Therefore, as shown in the figure, SPS periods are (20+10) ms and (20−10) ms. Offset starts from the first subframe in the bundled subframe.

|  | Frame n | | | | | | | | | | Frame n + 1 | | | | | | | | | |
|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 |
|  | D | S | U | U | D | D | S | U | U | D | D | S | U | U | D | D | S | U | U | D |
| PHICH |  |  | 2 |  |  |  |  |  |  |  |  |  |  | 1 |  |  |  |  |  |  |
| UL grant |  |  |  |  |  | 2 |  |  |  |  |  |  |  |  |  | 1 |  |  |  |  |
| PUSCH |  | 1 | 1 |  |  |  |  | 1 | 1 |  |  |  | 2 | 2 |  |  |  |  | 2 | 2 |

|  | Frame n + 2 | | | | | | | | | | Frame n + 3 | | | | | | | | | |
|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 |
|  | D | S | U | U | D | D | S | U | U | D | D | S | U | U | D | D | S | U | U | D |
| PHICH |  |  | 2 |  |  |  |  |  |  |  |  |  |  | 1 |  |  |  |  |  |  |
| UL grant |  |  |  |  |  | 2 |  |  |  |  |  |  |  |  |  | 1 |  |  |  |  |
| PUSCH |  | 1 | 1 |  |  |  |  | 1 | 1 |  |  |  | 2 | 2 |  |  |  |  | 2 | 2 |

|  | Frame n + 4 | | | | | | | | | | Frame n + 5 | | | | | | | | | |
|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 |
|  | D | S | U | U | D | D | S | U | U | D | D | S | U | U | D | D | S | U | U | D |
| PHICH |  |  | 2 |  |  |  |  |  |  |  |  |  |  | 1 |  |  |  |  |  |  |
| UL grant |  |  |  |  |  | 2 |  |  |  |  |  |  |  |  |  | 1 |  |  |  |  |
| PUSCH |  | 1 | 1 |  |  |  |  | 1 | 1 |  |  |  | 2 | 2 |  |  |  |  | 2 | 2 |

During semi-persistent scheduling SPS configuration, for a TDD UL/DL configuration 3:

The following describes a case in which three subframes are bundled. Similarly, a method of performing subframe offset for an existing (SPS) period is used. As shown in the following figure, two offset values are configured and used in a semi-persistent scheduling period. For adjacent UL subframes for SPS grant scheduling on which subframe bundling is configured, different offset values +10 and −10 are set. For example, an offset value for subframes of an odd-numbered frame is +10 and an offset value for subframes of an even-numbered frame is −10, or vice versa. Corresponding SPS periods are 30 ms and 10 ms. Therefore, as shown in the figure, SPS periods are (20+10) ms and (20−10) ms. Offset starts from the first subframe in the bundled subframe.

For a case in which two subframes are bundled, to avoid that a maximum quantity of available subframes cannot be used because an initially transmitted packet or an initially transmitted PUSCH collides with a retransmitted packet or PUSCH that is previously transmitted, three periods are set to perform SPS transmission in the bundled subframe. Starting from initial transmission, period offset values of SPS transmission are 22, 29, and 9 ms. The first subframes in corresponding initial SPS bundled subframes are respectively a subframe 2, a subframe 4, and a subframe 3.

|  | Frame n | | | | | | | | | | Frame n + 1 | | | | | | | | | |
|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 |
|  | D | S | U | U | U | D | D | D | D | D | D | S | U | U | U | D | D | D | D | D |
| PHICH | 1 |  |  |  |  |  |  |  |  |  | 2 |  |  |  |  |  |  |  |  |  |
| UL grant |  |  |  |  |  |  |  | 1 |  |  |  |  |  |  |  |  |  |  | 2 |  |
| PUSCH |  |  | 2 | 2 | 2 |  |  |  |  |  |  |  | 1 | 1 | 1 |  |  |  |  |  |

|  | Frame n + 2 | | | | | | | | | | Frame n + 3 | | | | | | | | | |
|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 |
|  | D | S | U | U | U | D | D | D | D | D | D | S | U | U | U | D | D | D | D | D |
| PHICH | 1 |  |  |  |  |  |  |  |  |  | 2 |  |  |  |  |  |  |  |  |  |
| UL grant |  |  |  |  |  |  |  | 1 |  |  |  |  |  |  |  |  |  |  | 2 |  |
| PUSCH |  |  | 2 | 2 | 2 |  |  |  |  |  |  |  | 1 | 1 | 1 |  |  |  |  |  |

|  | Frame n + 4 | | | | | | | | | | Frame n + 5 | | | | | | | | | |
|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 |
|  | D | S | U | U | U | D | D | D | D | D | D | S | U | U | U | D | D | D | D | D |
| PHICH | 1 |  |  |  |  |  |  |  |  |  | 2 |  |  |  |  |  |  |  |  |  |
| UL grant |  |  |  |  |  |  |  | 1 |  |  |  |  |  |  |  |  |  |  | 2 |  |
| PUSCH |  |  | 2 | 2 | 2 |  |  |  |  |  |  |  | 1 | 1 | 1 |  |  |  |  |  |

| | | | | | Frame n | | | | | | | | | | Frame n + 1 | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | D | D | D | D | D | S | U | U | U | D | D | D | D | D |
| PHICH | 3 | | | | | | | | | 1 | | | | | | | | | 2 | |
| UL grant | 2 | | | | | | | | | 3 | | | | | | | | | 1 | |
| PUSCH | | | 1 | 1 | 2 | | | | | | | | 2 | 3 | 3 | | | | | |

| | | | | | Frame n + 2 | | | | | | | | | | Frame n + 3 | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | D | D | D | D | D | S | U | U | U | D | D | D | D | D |
| PHICH | 3 | | | | | | | | | 1 | | | | | | | | | 2 | |
| UL grant | 2 | | | | | | | | | 3 | | | | | | | | | 1 | |
| PUSCH | | | 1 | 1 | 2 | | | | | | | | 2 | 3 | 3 | | | | | |

| | | | | | Frame n + 4 | | | | | | | | | | Frame n + 5 | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | D | D | D | D | D | S | U | U | U | D | D | D | D | D |
| PHICH | 3 | | | | | | | | | 1 | | | | | | | | | 2 | |
| UL grant | 2 | | | | | | | | | 3 | | | | | | | | | | |
| PUSCH | | | 1 | 1 | 2 | | | | | | | | 2 | 3 | 3 | | | | | |

During semi-persistent scheduling SPS configuration, for a TDD UL/DL configuration 6:

The following describes a case in which five subframes are bundled. Similarly, a method of performing subframe offset for an existing (SPS) period is used. As shown in the following figure, two offset values are configured and used in a semi-persistent scheduling period. For adjacent UL subframes for SPS grant scheduling on which subframe bundling is configured, different offset values +10 and −10 are set. For example, an offset value for subframes of an odd-numbered frame is +10 and an offset value for subframes of an even-numbered frame is −10, or vice versa. Corresponding SPS periods are 30 ms and 10 ms. Therefore, as shown in the figure, SPS periods are (20+10) ms and (20−10) ms. Offset starts from the first subframe in the bundled subframe.

detail with reference to FIG. 1 from the perspective of user equipment, and a method for transmitting uplink data according to an embodiment of the present invention is described below with reference to FIG. 2 from the perspective of a base station.

It should be understood that, interaction between UE and a base station and a related feature and function that are described on a base station side correspond to those described on a UE side, and for brevity, repeated descriptions are omitted properly.

Figure 2:
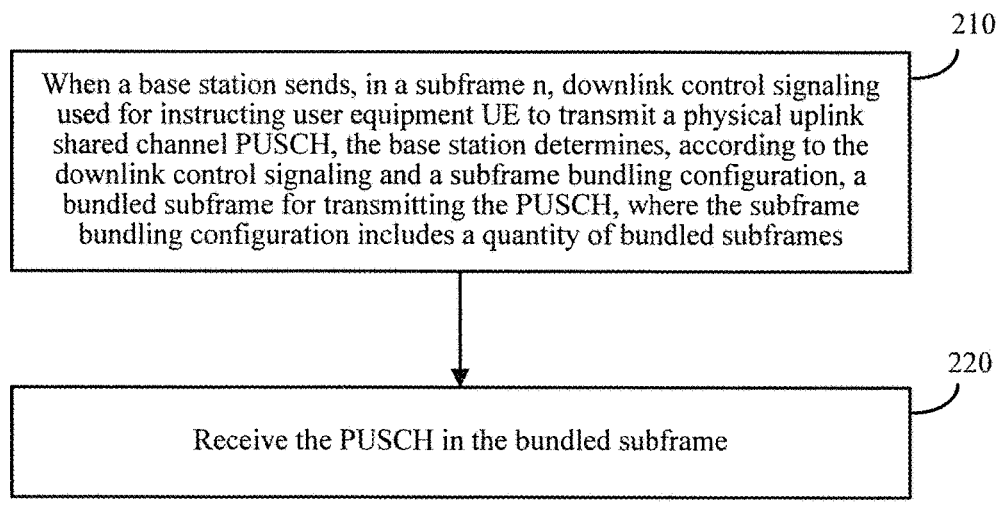
FIG. 2 is a schematic flowchart of a method for transmitting uplink data according to an embodiment of the present invention.

FIG. 2 is a schematic flowchart of a method for transmitting uplink data according to an embodiment of the present invention. The method in FIG. 2 is executed by a base station, which may be, for example, an eNB. The method in FIG. 2 includes:

| | | | | | Frame n | | | | | | | | | | Frame n + 1 | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | 2 | | | | | | | | | | 1 | | | | | |
| UL grant | | | | | 2 | | | | | | | | | | 1 | | | | | |
| PUSCH | | | 1 | 1 | 1 | | | 1 | 1 | | | | 2 | 2 | 2 | | | 2 | 2 | |

| | | | | | Frame n + 2 | | | | | | | | | | Frame n + 3 | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | 2 | | | | | | | | | | 1 | | | | | |
| UL grant | | | | | 2 | | | | | | | | | | 1 | | | | | |
| PUSCH | | | 1 | 1 | 1 | | | 1 | 1 | | | | 2 | 2 | 2 | | | 2 | 2 | |

| | | | | | Frame n + 4 | | | | | | | | | | Frame n + 5 | | | | |
|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| | D | S | U | U | U | D | S | U | U | D | D | S | U | U | U | D | S | U | U | D |
| PHICH | | | | | 2 | | | | | | | | | | 1 | | | | | |
| UL grant | | | | | 2 | | | | | | | | | | 1 | | | | | |
| PUSCH | | | 1 | 1 | 1 | | | 1 | 1 | | | | 2 | 2 | 2 | | | 2 | 2 | |

A method for transmitting uplink data according to an embodiment of the present invention is described above in

210: When the base station sends, in a subframe n, downlink control signaling used for instructing user equipment UE to transmit a physical uplink shared channel PUSCH, the base station determines, according to the downlink control signaling and a subframe bundling configuration, a bundled subframe for transmitting the PUSCH, where the subframe bundling configuration includes a quantity of bundled subframes.

220: Receive the PUSCH in the bundled subframe.

In this embodiment of the present invention, a bundled subframe is introduced, which increases scheduling resources for a PUSCH, and enhances coverage performance of a signal.

Optionally, as an embodiment, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

Optionally, as another embodiment, the quantity of bundled subframes is 12, and a quantity of hybrid automatic repeat request HARQ processes or a quantity of subframe bundling configurations of the UE is 1.

Optionally, as another embodiment, the quantity of bundled subframes is less than 12, and a quantity of HARQ processes or a quantity of subframe bundling configurations of the UE is greater than 1, and the method in FIG. 2 further includes: when the base station sends, to the UE, a physical hybrid automatic repeat request indicator channel PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

Optionally, as another embodiment, the quantity of bundled subframes is 4, a quantity of HARQ processes or a quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

Optionally, as another embodiment, the method further includes: sending indication information to the UE, where the indication information is used for instructing the UE to transmit the PUSCH according to the subframe bundling configuration.

Optionally, as another embodiment, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

Optionally, as another embodiment, the quantity of bundled subframes is 6, and a quantity of HARQ processes or a quantity of subframe bundling configurations of the UE is 1.

Optionally, as another embodiment, the quantity of bundled subframes is less than 6, and a quantity of HARQ processes or a quantity of subframe bundling configurations of the UE is greater than 1, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

Optionally, as another embodiment, the quantity of bundled subframes is 3, a quantity of HARQ processes or a quantity of subframe bundling configurations of the UE is 2, and n and l meet: when n=0, l=1; when n=9, l=1; or when n=8, l=8.

Optionally, as another embodiment, the quantity of bundled subframes is 2, a quantity of HARQ processes or a quantity of subframe bundling configurations of the UE is 3, and n and l meet: when n=0, l=2; when n=8, l=9; or when n=9, l=9.

Optionally, as another embodiment, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

Optionally, as another embodiment, the quantity of bundled subframes is 10.

Optionally, as another embodiment, a quantity of HARQ processes or a quantity of subframe bundling configurations of the UE is 1, and the bundled subframe is 10 consecutive uplink subframes in the configuration 6.

Optionally, as another embodiment, a quantity of HARQ processes or a quantity of subframe bundling configurations of the UE is 2, and an interval of one uplink subframe exists between adjacent subframes in the bundled subframe.

Optionally, as another embodiment, a quantity of HARQ processes or a quantity of subframe bundling configurations of the UE is 3, and an interval of four uplink subframes exists between adjacent subframes in the bundled subframe.

Optionally, as another embodiment, the quantity of bundled subframes is less than 10, and a quantity of HARQ processes or a quantity of subframe bundling configurations of the UE is greater than 1, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

Optionally, as another embodiment, the quantity of bundled subframes is 5, a quantity of HARQ processes or a quantity of subframe bundling configurations of the UE is 2, and n and l meet: when n=0, l=0; when n=1, l=0; when n=5, l=0; when n=6, l=0; or when n=9, l=0.

Optionally, as another embodiment, the quantity of bundled subframes is 2, a quantity of HARQ processes or a quantity of subframe bundling configurations of the UE is 3, and n and l meet: when n=0, l=−1; when n=5, l=−1; when n=9, when n=1, or when n=6, l=−3.

Optionally, as another embodiment, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe.

Optionally, as another embodiment, n, l, and k meet: when n=6, k=6 and l=2; or when n=1, k=6 and l=2.

Optionally, as another embodiment, n, k, and l meet: when n=4, k=4 and l=3; or when n=9, k=4 and l=3.

Optionally, as another embodiment, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the method further includes: receiving, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the method further includes: when the base station sends, to the UE, a PHICH used for instructing the UE to transmit the PUSCH, but does not send the downlink control signaling to the UE, determining, by the base station, the bundled subframe according to the PHICH and the subframe bundling configuration, where a sending subframe of the PHICH is the $l^{th}$ subframe before the subframe n; and receiving the PUSCH in the bundled subframe, where n, l, and k meet: when n=8, k=4 and l=0; or when n=9, k=4 and l=0.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 5, and the quantity of bundled subframes is 2.

Optionally, as another embodiment, a quantity of HARQ processes or a quantity of subframe bundling configurations of the UE is 4, and an interval of three uplink subframes exists between a previous subframe and a next subframe in the bundled subframe.

Optionally, as another embodiment, a quantity of HARQ processes or a quantity of subframe bundling configurations of the UE is 5, and an interval of four uplink subframes exists between a previous subframe and a next subframe in the bundled subframe.

Optionally, as another embodiment, the subframe bundling configuration is set to allow a quantity of subframes available for transmitting the PUSCH under a condition of meeting a requirement of a transmission latency to be equal to a quantity of uplink subframes in a semi-persistent scheduling period.

Methods for transmitting uplink data according to embodiments of the present invention are described in detail above with reference to FIG. 1 and FIG. 2, and UE and a base station according to embodiments of the present invention are described in detail below with reference to FIG. 3 and FIG. 4.

Figure 3:
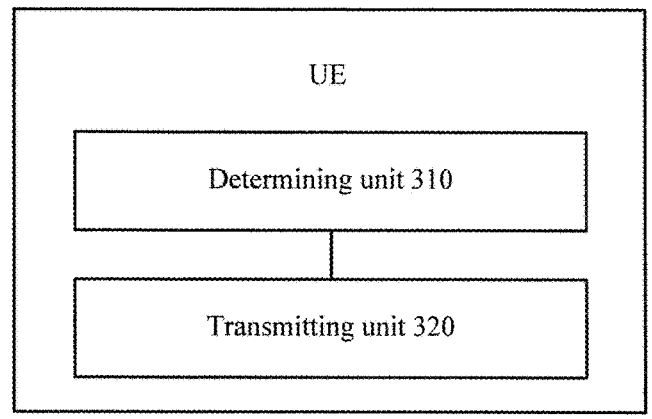
FIG. 3 is a schematic block diagram of UE according to an embodiment of the present invention.

FIG. 3 is a schematic block diagram of UE according to an embodiment of the present invention. The UE in FIG. 3 includes: a determining unit 310 and a transmitting unit 320.

The UE in FIG. 3 can implement steps that are performed by UE in FIG. 1 and FIG. 2. To avoid repetition, details are not described again.

The determining unit 310 is configured to: when the UE correctly receives, in a subframe n, downlink control signaling used for instructing the UE to transmit a physical uplink shared channel PUSCH, determine, according to the downlink control signaling and a subframe bundling configuration, a bundled subframe for transmitting the PUSCH, where the subframe bundling configuration includes a quantity of bundled subframes; and the transmitting unit 320 is configured to transmit the PUSCH in the bundled subframe determined by the determining unit 310.

In this embodiment of the present invention, a bundled subframe is introduced, which increases scheduling resources for a PUSCH, and enhances coverage performance of a signal.

Optionally, as an embodiment, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

Optionally, as another embodiment, the quantity of bundled subframes is 12, and a quantity of hybrid automatic repeat request HARQ processes or a quantity of subframe bundling configurations of the UE is 1.

Optionally, as another embodiment, the quantity of bundled subframes is less than 12, and a quantity of HARQ processes or a quantity of subframe bundling configurations of the UE is greater than 1, and the determining unit 310 is further configured to: when the UE does not correctly receive the downlink control signaling, determine the bundled subframe according to a physical hybrid automatic repeat request indicator channel PHICH used for instructing the UE to transmit the PUSCH and the subframe bundling configuration, where a receiving subframe of the PHICH is the $l^{th}$ subframe before the subframe n; and the transmitting unit 320 is further configured to transmit the PUSCH in the bundled subframe determined by the determining unit 310.

Optionally, as another embodiment, the quantity of bundled subframes is 4, a quantity of HARQ processes or a quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

Optionally, as another embodiment, the UE further includes: a receiving unit, configured to receive indication information sent by a base station, where the indication information is used for instructing the UE to transmit the PUSCH according to the subframe bundling configuration.

Optionally, as another embodiment, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

Optionally, as another embodiment, the quantity of bundled subframes is 6, and a quantity of HARQ processes or a quantity of subframe bundling configurations of the UE is 1.

Optionally, as another embodiment, the quantity of bundled subframes is less than 6, and a quantity of HARQ processes or a quantity of subframe bundling configurations of the UE is greater than 1, and the determining unit 310 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit 320 is further configured to transmit the PUSCH in the bundled subframe determined by the determining unit 310.

Optionally, as another embodiment, the quantity of bundled subframes is 3, a quantity of HARQ processes or a quantity of subframe bundling configurations of the UE is 2, and n and l meet: when n=0, l=1; when n=9, l=1; or when n=8, l=8.

Optionally, as another embodiment, the quantity of bundled subframes is 2, a quantity of HARQ processes or a quantity of subframe bundling configurations of the UE is 3, and n and l meet: when n=0, l=2; when n=8, l=9; or when n=9, l=9.

Optionally, as another embodiment, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

Optionally, as another embodiment, the quantity of bundled subframes is 10.

Optionally, as another embodiment, a quantity of HARQ processes or a quantity of subframe bundling configurations of the UE is 1, and the bundled subframe is 10 consecutive uplink subframes in the configuration 6.

Optionally, as another embodiment, a quantity of HARQ processes or a quantity of subframe bundling configurations of the UE is 2, and an interval of one uplink subframe exists between adjacent subframes in the bundled subframe.

Optionally, as another embodiment, a quantity of HARQ processes or a quantity of subframe bundling configurations of the UE is 3, and an interval of four uplink subframes exists between adjacent subframes in the bundled subframe.

Optionally, as another embodiment, the quantity of bundled subframes is less than 10, and a quantity of HARQ processes or a quantity of subframe bundling configurations of the UE is greater than 1, and the determining unit 310 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit 320 is further configured to transmit the PUSCH in the bundled subframe determined by the determining unit 310.

Optionally, as another embodiment, the quantity of bundled subframes is 5, a quantity of HARQ processes or a quantity of subframe bundling configurations of the UE is 2, and n and l meet: when n=0, l=0; when n=1, l=0; when n=5, l=0; when n=6, l=0; or when n=9, l=0.

Optionally, as another embodiment, the quantity of bundled subframes is 2, a quantity of HARQ processes or a quantity of subframe bundling configurations of the UE is 3, and n and l meet: when n=0, when n=5, l=−1; when n=9, when n=1, l=−4; or when n=6, l=−3.

Optionally, as another embodiment, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the determining unit 310 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit 320 is further configured to transmit the PUSCH in the bundled subframe determined by the determining unit 310.

Optionally, as another embodiment, n, l, and k meet: when n=6, k=6 and l=2; or when n=1, k=6 and l=2.

Optionally, as another embodiment, n, k, and l meet: when n=4, k=4 and l=3; or when n=9, k=4 and l=3.

Optionally, as another embodiment, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the UE further includes: a receiving unit, configured to receive, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the determining unit 310 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitting unit 320 is further configured to transmit the PUSCH in the bundled subframe determined by the determining unit 310, where n, l, and k meet: when n=8, k=4 and l=0; or when n=9, k=4 and l=0.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 5, and the quantity of bundled subframes is 2.

Optionally, as another embodiment, a quantity of HARQ processes or a quantity of subframe bundling configurations of the UE is 4, and an interval of three uplink subframes exists between a previous subframe and a next subframe in the bundled subframe.

Optionally, as another embodiment, a quantity of HARQ processes or a quantity of subframe bundling configurations of the UE is 5, and an interval of four uplink subframes exists between a previous subframe and a next subframe in the bundled subframe.

Optionally, as another embodiment, the subframe bundling configuration is set to allow a quantity of subframes available for transmitting the PUSCH under a condition of meeting a requirement of a transmission latency to be equal to a quantity of uplink subframes in a semi-persistent scheduling period.

Figure 4:
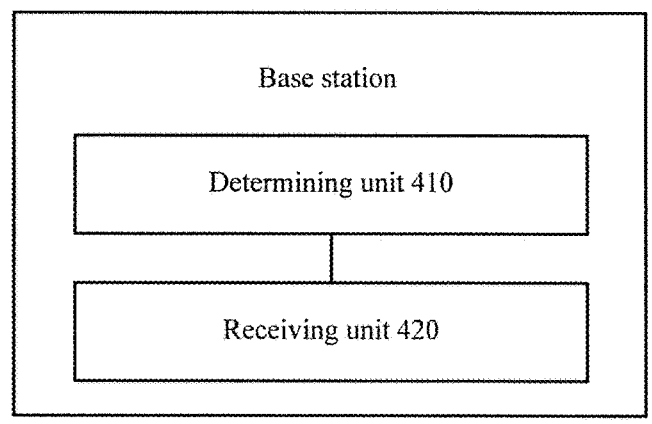
FIG. 4 is a schematic block diagram of a base station according to an embodiment of the present invention.

FIG. 4 is a schematic block diagram of a base station according to an embodiment of the present invention. The base station in FIG. 4 includes: a determining unit 410 and a receiving unit 420.

The base station in FIG. 4 can implement steps that are performed by a base station in FIG. 1 and FIG. 2. To avoid repetition, details are not described again.

The determining unit 410 is configured to: when the base station sends, in a subframe n, downlink control signaling used for instructing user equipment UE to transmit a physical uplink shared channel PUSCH, determine, according to the downlink control signaling and a subframe bundling configuration, a bundled subframe for transmitting the PUSCH, where the subframe bundling configuration includes a quantity of bundled subframes; and the receiving unit 420 is configured to receive the PUSCH in the bundled subframe determined by the determining unit 410.

In this embodiment of the present invention, a bundled subframe is introduced, which increases scheduling resources for a PUSCH, and enhances coverage performance of a signal.

Optionally, as an embodiment, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

Optionally, as another embodiment, the quantity of bundled subframes is 12, and a quantity of hybrid automatic repeat request HARQ processes or a quantity of subframe bundling configurations of the UE is 1.

Optionally, as another embodiment, the quantity of bundled subframes is less than 12, and a quantity of HARQ processes or a quantity of subframe bundling configurations of the UE is greater than 1, and the determining unit 410 is further configured to: when the base station sends, to the UE, a physical hybrid automatic repeat request indicator channel PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit 420 is further configured to receive the PUSCH in the bundled subframe determined by the determining unit 410.

Optionally, as another embodiment, the quantity of bundled subframes is 4, a quantity of HARQ processes or a quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

Optionally, as another embodiment, the base station further includes: a sending unit, configured to send indication information to the UE, where the indication information is used for instructing the UE to transmit the PUSCH according to the subframe bundling configuration.

Optionally, as another embodiment, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

Optionally, as another embodiment, the quantity of bundled subframes is 6, and a quantity of HARQ processes or a quantity of subframe bundling configurations of the UE is 1.

Optionally, as another embodiment, the quantity of bundled subframes is less than 6, and a quantity of HARQ processes or a quantity of subframe bundling configurations of the UE is greater than 1, and the determining unit 410 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the subframe before the subframe n; and the receiving unit 420 is further configured to receive the PUSCH in the bundled subframe determined by the determining unit 410.

Optionally, as another embodiment, the quantity of bundled subframes is 3, a quantity of HARQ processes or a quantity of subframe bundling configurations of the UE is 2, and n and l meet: when n=0, l=1; when n=9, l=1; or when n=8, l=8.

Optionally, as another embodiment, the quantity of bundled subframes is 2, a quantity of HARQ processes or a quantity of subframe bundling configurations of the UE is 3, and n and l meet: when n=0, l=2; when n=8, l=9; or when n=9, l=9.

Optionally, as another embodiment, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

Optionally, as another embodiment, the quantity of bundled subframes is 10.

Optionally, as another embodiment, a quantity of HARQ processes or a quantity of subframe bundling configurations of the UE is 1, and the bundled subframe is 10 consecutive uplink subframes in the configuration 6.

Optionally, as another embodiment, a quantity of HARQ processes or a quantity of subframe bundling configurations of the UE is 2, and an interval of one uplink subframe exists between adjacent subframes in the bundled subframe.

Optionally, as another embodiment, a quantity of HARQ processes or a quantity of subframe bundling configurations of the UE is 3, and an interval of four uplink subframes exists between adjacent subframes in the bundled subframe.

Optionally, as another embodiment, the quantity of bundled subframes is less than 10, and a quantity of HARQ processes or a quantity of subframe bundling configurations of the UE is greater than 1, and the determining unit 410 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit 420 is further configured to receive the PUSCH in the bundled subframe determined by the determining unit 410.

Optionally, as another embodiment, the quantity of bundled subframes is 5, a quantity of HARQ processes or a quantity of subframe bundling configurations of the UE is 2, and n and l meet: when n=0, l=0; when n=1, l=0; when n=5, l=0; when n=6, l=0; or when n=9, l=0.

Optionally, as another embodiment, the quantity of bundled subframes is 2, a quantity of HARQ processes or a quantity of subframe bundling configurations of the UE is 3, and n and l meet: when n=0, l=−1; when n=5, l=−1; when n=9, l=−1; when n=1, or when n=6, l=−3.

Optionally, as another embodiment, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the determining unit 410 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit 420 is further configured to receive the PUSCH in the bundled subframe determined by the determining unit 410.

Optionally, as another embodiment, n, l, and k meet: when n=6, k=6 and l=2; or when n=1, k=6 and l=2.

Optionally, as another embodiment, n, k, and l meet: when n=4, k=4 and l=3; or when n=9, k=4 and l=3.

Optionally, as another embodiment, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the receiving unit is further configured to receive, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the determining unit 410 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiving unit 420 is further configured to receive the PUSCH in the bundled subframe determined by the determining unit 410, where n, l, and k meet: when n=8, k=4 and l=0; or when n=9, k=4 and l=0.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 5, and the quantity of bundled subframes is 2.

Optionally, as another embodiment, a quantity of HARQ processes or a quantity of subframe bundling configurations of the UE is 4, and an interval of three uplink subframes exists between a previous subframe and a next subframe in the bundled subframe.

Optionally, as another embodiment, a quantity of HARQ processes or a quantity of subframe bundling configurations of the UE is 5, and an interval of four uplink subframes exists between a previous subframe and a next subframe in the bundled subframe.

Optionally, as another embodiment, the subframe bundling configuration is set to allow a quantity of subframes available for transmitting the PUSCH under a condition of meeting a requirement of a transmission latency to be equal to a quantity of uplink subframes in a semi-persistent scheduling period.

Figure 5:
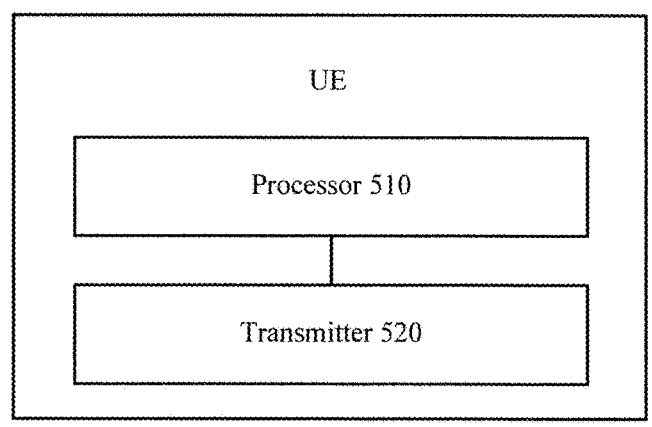
FIG. 5 is a schematic block diagram of UE according to an embodiment of the present invention.

FIG. 5 is a schematic block diagram of UE according to an embodiment of the present invention. The UE in FIG. 5 includes a processor 510 and a transmitter 520.

The UE in FIG. 5 can implement steps that are performed by UE in FIG. 1 and FIG. 2. To avoid repetition, details are not described again.

The processor 510 is configured to: when the UE correctly receives, in a subframe n, downlink control signaling used for instructing the UE to transmit a physical uplink shared channel PUSCH, determine, according to the downlink control signaling and a subframe bundling configuration, a bundled subframe for transmitting the PUSCH, where the subframe bundling configuration includes a quantity of bundled subframes; and the transmitter 520 is configured to transmit the PUSCH in the bundled subframe determined by the processor 510.

In this embodiment of the present invention, a bundled subframe is introduced, which increases scheduling resources for a PUSCH, and enhances coverage performance of a signal.

Optionally, as an embodiment, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

Optionally, as another embodiment, the quantity of bundled subframes is 12, and a quantity of hybrid automatic repeat request HARQ processes or a quantity of subframe bundling configurations of the UE is 1.

Optionally, as another embodiment, the quantity of bundled subframes is less than 12, and a quantity of HARQ processes or a quantity of subframe bundling configurations of the UE is greater than 1, and the processor 510 is further configured to: when the UE does not correctly receive the downlink control signaling, determine the bundled subframe according to a physical hybrid automatic repeat request indicator channel PHICH used for instructing the UE to transmit the PUSCH and the subframe bundling configuration, where a receiving subframe of the PHICH is the $l^{th}$ subframe before the subframe n; and the transmitter 520 is further configured to transmit the PUSCH in the bundled subframe determined by the processor 510.

Optionally, as another embodiment, the quantity of bundled subframes is 4, a quantity of HARQ processes or a quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

Optionally, as another embodiment, the UE further includes: a receiver, configured to receive indication information sent by a base station, where the indication information is used for instructing the UE to transmit the PUSCH according to the subframe bundling configuration.

Optionally, as another embodiment, a current uplink/downlink subframe configuration is a configuration 3, the quantity of bundled subframes is an integer greater than or equal to 1 and less than or equal to 6, a start subframe of the bundled subframe is the $l^{th}$ subframe located after the subframe n, and n and k meet: when n=0, k=4; when n=8, k=4; or when n=9, k=4.

Optionally, as another embodiment, the quantity of bundled subframes is 6, and a quantity of HARQ processes or a quantity of subframe bundling configurations of the UE is 1.

Optionally, as another embodiment, the quantity of bundled subframes is less than 6, and a quantity of HARQ processes or a quantity of subframe bundling configurations of the UE is greater than 1, and the processor 510 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitter 520 is further configured to transmit the PUSCH in the bundled subframe determined by the processor 510.

Optionally, as another embodiment, the quantity of bundled subframes is 3, a quantity of HARQ processes or a quantity of subframe bundling configurations of the UE is 2, and n and l meet: when n=0, l=1; when n=9, l=1; or when n=8, l=8.

Optionally, as another embodiment, the quantity of bundled subframes is 2, a quantity of HARQ processes or a quantity of subframe bundling configurations of the UE is 3, and n and l meet: when n=0, l=2; when n=8, l=9; or when n=9, l=9.

Optionally, as another embodiment, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

Optionally, as another embodiment, the quantity of bundled subframes is 10.

Optionally, as another embodiment, a quantity of HARQ processes or a quantity of subframe bundling configurations of the UE is 1, and the bundled subframe is 10 consecutive uplink subframes in the configuration 6.

Optionally, as another embodiment, a quantity of HARQ processes or a quantity of subframe bundling configurations of the UE is 2, and an interval of one uplink subframe exists between adjacent subframes in the bundled subframe.

Optionally, as another embodiment, a quantity of HARQ processes or a quantity of subframe bundling configurations of the UE is 3, and an interval of four uplink subframes exists between adjacent subframes in the bundled subframe.

Optionally, as another embodiment, the quantity of bundled subframes is less than 10, and a quantity of HARQ processes or a quantity of subframe bundling configurations of the UE is greater than 1, and the processor 510 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitter 520 is further configured to transmit the PUSCH in the bundled subframe determined by the processor 510.

Optionally, as another embodiment, the quantity of bundled subframes is 5, a quantity of HARQ processes or a quantity of subframe bundling configurations of the UE is 2, and n and l meet: when n=0, l=0; when n=1, l=0; when n=5, l=0; when n=6, l=0; or when n=9, l=0.

Optionally, as another embodiment, the quantity of bundled subframes is 2, a quantity of HARQ processes or a quantity of subframe bundling configurations of the UE is 3, and n and l meet: when n=0, when n=5, l=−1; when n=9, l=−1; when n=1, l=−4; or when n=6, l=−3.

Optionally, as another embodiment, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the processor 510 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitter 520 is further configured to transmit the PUSCH in the bundled subframe determined by the processor 510.

Optionally, as another embodiment, n, l, and k meet: when n=6, k=6 and l=2; or when n=1, k=6 and l=2.

Optionally, as another embodiment, n, k, and l meet: when n=4, k=4 and l=3; or when n=9, k=4 and l=3.

Optionally, as another embodiment, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the UE further includes: a receiver, configured to receive, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the processor 510 is further configured to: when the UE does not correctly receive the downlink control signaling, determine the bundled subframe according to a PHICH used for instructing the UE to transmit the PUSCH and the subframe bundling configuration, where a receiving subframe of the PHICH is the $l^{th}$ subframe before the subframe n; and the transmitter 520 is further configured to transmit the PUSCH in the bundled subframe determined by the processor 510, where n, l, and k meet: when n=8, k=4 and l=0; or when n=9, k=4 and l=0.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 5, and the quantity of bundled subframes is 2.

Optionally, as another embodiment, a quantity of HARQ processes or a quantity of subframe bundling configurations of the UE is 4, and an interval of three uplink subframes exists between a previous subframe and a next subframe in the bundled subframe.

Optionally, as another embodiment, a quantity of HARQ processes or a quantity of subframe bundling configurations of the UE is 5, and an interval of four uplink subframes exists between a previous subframe and a next subframe in the bundled subframe.

Optionally, as another embodiment, the subframe bundling configuration is set to allow a quantity of subframes available for transmitting the PUSCH under a condition of meeting a requirement of a transmission latency to be equal to a quantity of uplink subframes in a semi-persistent scheduling period.

Figure 6:
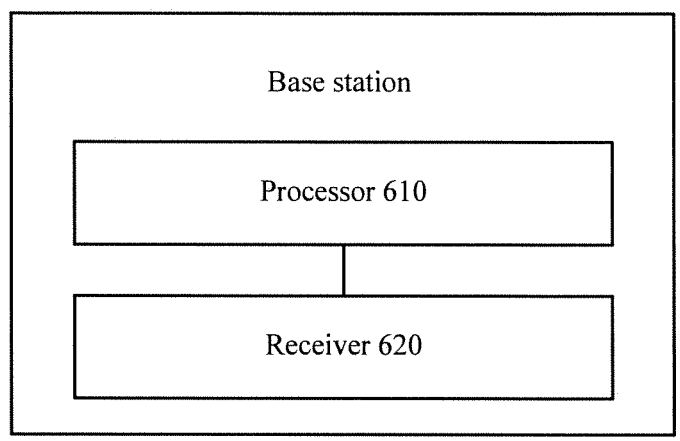
FIG. 6 is a schematic block diagram of a base station according to an embodiment of the present invention.

FIG. 6 is a schematic block diagram of a base station according to an embodiment of the present invention. The base station in FIG. 6 includes: a processor 610 and a receiver 620.

The base station in FIG. 6 can implement steps that are performed by a base station in FIG. 1 and FIG. 2. To avoid repetition, details are not described again.

The processor 610 is configured to: when the base station sends, in a subframe n, downlink control signaling used for instructing user equipment UE to transmit a physical uplink shared channel PUSCH, determine, according to the downlink control signaling and a subframe bundling configuration, a bundled subframe for transmitting the PUSCH, where the subframe bundling configuration includes a quantity of bundled subframes; and the receiver 620 is configured to receive the PUSCH in the bundled subframe determined by the processor 610.

In this embodiment of the present invention, a bundled subframe is introduced, which increases scheduling resources for a PUSCH, and enhances coverage performance of a signal.

Optionally, as an embodiment, a current uplink/downlink subframe configuration is a configuration 0, the quantity of bundled subframes is an integer greater than or equal to 1 and less than or equal to 12, a start subframe of the bundled subframe is the $k^{th}$ subframe located after the subframe n, and n and k meet: when n=0, k=4 or 7; when n=5, k=4 or 7; when n=1, k=6 or 7; or when n=6, k=6 or 7.

Optionally, as another embodiment, the quantity of bundled subframes is 12, and a quantity of hybrid automatic repeat request HARQ processes or a quantity of subframe bundling configurations of the UE is 1.

Optionally, as another embodiment, the quantity of bundled subframes is less than 12, and a quantity of HARQ processes or a quantity of subframe bundling configurations of the UE is greater than 1, and the processor 610 is further configured to: when the base station sends, to the UE, a physical hybrid automatic repeat request indicator channel PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiver 620 is further configured to receive the PUSCH in the bundled subframe determined by the processor 610.

Optionally, as another embodiment, the quantity of bundled subframes is 4, a quantity of HARQ processes or a quantity of subframe bundling configurations of the UE is 3, and n and l meet: when n is 0, a value of l is 4 or 5; when n is 5, a value of l is 4 or 5; when n is 1, a value of l is 1 or 5; or when n is 6, a value of l is 1 or 5.

Optionally, as another embodiment, the base station further includes: a transmitter, configured to send indication information to the UE, where the indication information is used for instructing the UE to transmit the PUSCH according to the subframe bundling configuration.

Optionally, as another embodiment, a current uplink/downlink subframe configuration is a configuration 3, the quantity of bundled subframes is an integer greater than or equal to 1 and less than or equal to 6, a start subframe of the bundled subframe is the $k^{th}$ subframe located after the subframe n, and n and k meet: when n=0, k=4; when n=8, k=4; or when n=9, k=4.

Optionally, as another embodiment, the quantity of bundled subframes is 6, and a quantity of HARQ processes or a quantity of subframe bundling configurations of the UE is 1.

Optionally, as another embodiment, the quantity of bundled subframes is less than 6, and a quantity of HARQ processes or a quantity of subframe bundling configurations of the UE is greater than 1, and the processor 610 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiver 620 is further configured to receive the PUSCH in the bundled subframe determined by the processor 610.

Optionally, as another embodiment, the quantity of bundled subframes is 3, a quantity of HARQ processes or a quantity of subframe bundling configurations of the UE is 2, and n and l meet: when n=0, l=1; when n=9, l=1; or when n=8, l=8.

Optionally, as another embodiment, the quantity of bundled subframes is 2, a quantity of HARQ processes or a quantity of subframe bundling configurations of the UE is 3, and n and l meet: when n=0, l=2; when n=8, l=9; or when n=9, l=9.

Optionally, as another embodiment, a current uplink/downlink subframe configuration is a configuration 6, the quantity of bundled subframes is an integer greater than or equal to 1 and less than or equal to 10, a start subframe of the bundled subframe is the $k^{th}$ subframe located after the subframe n, and n and k meet: when n=0, k=7; when n=1, k=7; when n=5, k=7; when n=6, k=7; or when n=9, k=5.

Optionally, as another embodiment, the quantity of bundled subframes is 10.

Optionally, as another embodiment, a quantity of HARQ processes or a quantity of subframe bundling configurations of the UE is 1, and the bundled subframe is 10 consecutive uplink subframes in the configuration 6.

Optionally, as another embodiment, a quantity of HARQ processes or a quantity of subframe bundling configurations of the UE is 2, and an interval of one uplink subframe exists between adjacent subframes in the bundled subframe.

Optionally, as another embodiment, a quantity of HARQ processes or a quantity of subframe bundling configurations of the UE is 3, and an interval of four uplink subframes exists between adjacent subframes in the bundled subframe.

Optionally, as another embodiment, the quantity of bundled subframes is less than 10, and a quantity of HARQ processes or a quantity of subframe bundling configurations of the UE is greater than 1, and the processor 610 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiver 620 is further configured to receive the PUSCH in the bundled subframe determined by the processor 610.

Optionally, as another embodiment, the quantity of bundled subframes is 5, a quantity of HARQ processes or a quantity of subframe bundling configurations of the UE is 2, and n and l meet: when n=0, l=0; when n=1, l=0; when n=5, l=0; when n=6, l=0; or when n=9, l=0.

Optionally, as another embodiment, the quantity of bundled subframes is 2, a quantity of HARQ processes or a quantity of subframe bundling configurations of the UE is 3, and n and l meet: when n=0, l=−1; when n=5, when n=9, l=−1; when n=1, or when n=6, l=−3.

Optionally, as another embodiment, a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after the subframe n, and the processor 610 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiver 620 is further configured to receive the PUSCH in the bundled subframe determined by the processor 610.

Optionally, as another embodiment, n, l, and k meet: when n=6, k=6 and l=2; or when n=1, k=6 and l=2.

Optionally, as another embodiment, n, k, and l meet: when n=4, k=4 and l=3; or when n=9, k=4 and l=3.

Optionally, as another embodiment, a current uplink/downlink subframe configuration is a configuration 2, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the receiver is further configured to receive, in the $(l+k)^{th}$ subframe after the subframe n, a PHICH used for indicating whether the PUSCH needs to be retransmitted, where n, k, and l meet: when n=3, k=4 and l=11; or when n=8, k=4 and l=11.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 4, the quantity of bundled subframes is an integer greater than or equal to 1 and less than or equal to 4, a start subframe of the bundled subframe is the $k^{th}$ subframe located after the subframe n, and a quantity of HARQ processes or a quantity of subframe bundling configurations of the UE is 3.

Optionally, as another embodiment, the quantity of bundled subframes is 1, and the processor 610 is further configured to: when the base station sends, to the UE, a PHICH used for instructing the UE to transmit the PUSCH, but does not send the downlink control signaling to the UE, determine the bundled subframe according to the PHICH and the subframe bundling configuration, where a sending subframe of the PHICH is the $l^{th}$ subframe before the subframe n; and the receiver 620 is further configured to receive the PUSCH in the bundled subframe determined by the processor 610, where n, l, and k meet: when n=8, k=4 and l=0; or when n=9, k=4 and l=0.

Optionally, as another embodiment, the quantity of bundled subframes is 4, and an interval of two uplink subframes exists between adjacent subframes in the bundled subframe.

Optionally, as another embodiment, a current uplink/downlink subframe configuration is a configuration 5, and the quantity of bundled subframes is 2.

Optionally, as another embodiment, a quantity of HARQ processes or a quantity of subframe bundling configurations of the UE is 4, and an interval of three uplink subframes exists between a previous subframe and a next subframe in the bundled subframe.

Optionally, as another embodiment, a quantity of HARQ processes or a quantity of subframe bundling configurations of the UE is 5, and an interval of four uplink subframes exists between a previous subframe and a next subframe in the bundled subframe.

Optionally, as another embodiment, the subframe bundling configuration is set to allow a quantity of subframes available for transmitting the PUSCH under a condition of meeting a requirement of a transmission latency to be equal to a quantity of uplink subframes in a semi-persistent scheduling period.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting uplink data, the method comprising:
   when user equipment (UE) correctly receives, in a subframe n, downlink control signaling used for instructing the UE to transmit a physical uplink shared channel (PUSCH), determining, by the UE according to the downlink control signaling and a subframe bundling configuration, a bundled subframe for transmitting the PUSCH, wherein the subframe bundling configuration comprises a quantity of bundled subframes;
   when the UE does not correctly receive the downlink control signaling, determining, by the UE, the bundled subframe according to a physical hybrid automatic repeat request indicator channel (PHICH) used for instructing the UE to transmit the PUSCH and the subframe bundling configuration, wherein a receiving subframe of the PHICH is the $l^{th}$ subframe before the subframe n; and
   transmitting, by the UE, the PUSCH in the bundled subframe.

2. The method according to claim 1, wherein a current uplink/downlink subframe configuration is a configuration 0, a quantity of bundled subframes is an integer greater than or equal to 1 and less than or equal to 12, a start subframe of the bundled subframe is the $k^{th}$ subframe located after a subframe n, and n and k meet:
   when n=0, k=4 or 7;
   when n=5, k=4 or 7;
   when n=1, k=6 or 7; or
   when n=6, k=6 or 7.

3. The method according to claim 2, wherein the quantity of bundled subframes is 12, and a quantity of hybrid automatic repeat request (HARQ) processes or a quantity of subframe bundling configurations of the UE is 1.

4. The method according to claim 2, wherein:
   the quantity of bundled subframes is less than 12, and a quantity of HARQ processes or a quantity of subframe bundling configurations of the UE is greater than 1.

5. The method according to claim 1, wherein:
   a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after a subframe n.

6. The method according to claim 5, wherein n, l, and k meet:
   when n=6, k=6 and l=2; or
   when n=1, k=6 and l=2.

7. The method according to claim 5, wherein n, k, and l meet:
   when n=4, k=4 and l=3; or
   when n=9, k=4 and l=3.

8. The method according to claim 1, wherein a current uplink/downlink subframe configuration is a configuration 2, the quantity of bundled subframes is an integer greater than or equal to 1 and less than or equal to 4, a start subframe of the bundled subframe is the $k^{th}$ subframe located after a subframe n, and a quantity of HARQ processes or a quantity of subframe bundling configurations of the UE is 3.

9. The method according to claim 8, wherein:
   the quantity of bundled subframes is 1; and
   the method further comprises:
      receiving, in the $(l+k)^{th}$ subframe after the subframe n, a physical hybrid automatic repeat request indicator channel (PHICH) used for indicating whether the PUSCH needs to be retransmitted, wherein n, k, and l meet:
      when n=3, k=4 and l=11; or
      when n=8, k=4 and l=11.

10. The method according to claim 8, wherein the quantity of bundled subframes is 4, and an interval of two uplink subframes exists between adjacent subframes in the bundled subframe.

11. User equipment (UE), comprising:
   a processor configured to:
      when the UE correctly receives, in a subframe n, downlink control signaling used for instructing the UE to transmit a physical uplink shared channel (PUSCH), determine, according to the downlink control signaling and a subframe bundling configuration, a bundled subframe for transmitting the PUSCH, wherein the subframe bundling configuration comprises a quantity of bundled subframes;

when the UE does not correctly receive the downlink control signaling, determining, by the UE, the bundled subframe according to a physical hybrid automatic repeat request indicator channel (PHICH) used for instructing the UE to transmit the PUSCH and the subframe bundling configuration, wherein a receiving subframe of the PHICH is the $l^{th}$ subframe before the subframe n; and a transmitter configured to: transmit the PUSCH in the bundled subframe determined by the processor.

12. The UE according to claim 11, wherein a current uplink/downlink subframe configuration is a configuration 0, the quantity of bundled subframes is an integer greater than or equal to 1 and less than or equal to 12, a start subframe of the bundled subframe is the $k^{th}$ subframe located after a subframe n, and n and k meet:
when n=0, k=4 or 7;
when n=5, k=4 or 7;
when n=1, k=6 or 7; or
when n=6, k=6 or 7.

13. The UE according to claim 12, wherein the quantity of bundled subframes is 12, and a quantity of hybrid automatic repeat request (HARQ) processes or a quantity of subframe bundling configurations of the UE is 1.

14. The UE according to claim 12, wherein:
the quantity of bundled subframes is less than 12, and a quantity of HARQ processes or a quantity of subframe bundling configurations of the UE is greater than 1.

15. The UE according to claim 11, wherein:
a current uplink/downlink subframe configuration is a configuration 1, the quantity of bundled subframes is 2, a quantity of HARQ processes or a quantity of subframe bundling configurations is 3, and a start subframe of the bundled subframe is the $k^{th}$ subframe located after a subframe n.

16. The UE according to claim 15, wherein n, l, and k meet:
when n=6, k=6 and l=2; or
when n=1, k=6 and l=2.

17. The UE according to claim 15, wherein n, k, and l meet:
when n=4, k=4 and l=3; or
when n=9, k=4 and l=3.

18. The UE according to claim 11, wherein a current uplink/downlink subframe configuration is a configuration 2, the quantity of bundled subframes is an integer greater than or equal to 1 and less than or equal to 4, a start subframe of the bundled subframe is the $k^{th}$ subframe located after a subframe n, and a quantity of HARQ processes or a quantity of subframe bundling configurations of the UE is 3.

19. The UE according to claim 18, wherein:
the quantity of bundled subframes is 1, and
the UE further comprises:
a receiver configured to receive, in the $(l+k)^{th}$ subframe after the subframe n, a physical hybrid automatic repeat request indicator channel (PHICH) used for indicating whether the PUSCH needs to be retransmitted, wherein n, k, and l meet:
when n=3, k=4 and l=11; or
when n=8, k=4 and l=11.

20. The UE according to claim 18, wherein the quantity of bundled subframes is 4, and an interval of two uplink subframes exists between adjacent subframes in the bundled subframe.

21. A apparatus, comprising:
a memory storing instructions; and
a processor coupled to the memory to execute the instructions to:
when a UE correctly receives, in a subframe n, downlink control signaling used for instructing the UE to transmit a physical uplink shared channel (PUSCH), determine, according to the downlink control signaling and a subframe bundling configuration, a bundled subframe for transmitting the PUSCH, wherein the subframe bundling configuration comprises a quantity of bundled subframes;
when the UE does not correctly receive the downlink control signaling, determine the bundled subframe according to a physical hybrid automatic repeat request indicator channel (PHICH) used for instructing the UE to transmit the PUSCH and the subframe bundling configuration, wherein a receiving subframe of the PHICH is the lth subframe before the subframe n; and
cause the UE to transmit the PUSCH in the bundled subframe.

* * * * *